US011947869B2

(12) United States Patent
Takahashi et al.

(10) Patent No.: US 11,947,869 B2
(45) Date of Patent: Apr. 2, 2024

(54) INFORMATION PROCESSING DEVICE, INFORMATION PROCESSING METHOD, AND PROGRAM

(71) Applicant: SONY GROUP CORPORATION, Tokyo (JP)

(72) Inventors: Kei Takahashi, Tokyo (JP); Junichi Shimizu, Tokyo (JP); Junichi Nagahara, Tokyo (JP); Manabu Fujiki, Tokyo (JP); Tomohiro Imura, Tokyo (JP); Keiichi Kitahara, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 145 days.

(21) Appl. No.: 17/598,075

(22) PCT Filed: Mar. 23, 2020

(86) PCT No.: PCT/JP2020/012787
§ 371 (c)(1),
(2) Date: Sep. 24, 2021

(87) PCT Pub. No.: WO2020/203425
PCT Pub. Date: Oct. 8, 2020

(65) Prior Publication Data
US 2022/0179616 A1   Jun. 9, 2022

(30) Foreign Application Priority Data

Apr. 1, 2019 (JP) .................................. 2019-069643

(51) Int. Cl.
*G06F 3/16* (2006.01)
*G06F 3/01* (2006.01)
(Continued)

(52) U.S. Cl.
CPC .............. *G06F 3/165* (2013.01); *G06F 3/017* (2013.01); *H04R 1/1041* (2013.01); *G06F 3/03547* (2013.01); *H04R 2430/01* (2013.01)

(58) Field of Classification Search
CPC ...... G06F 3/165; G06F 3/017; G06F 3/03547; H04R 1/1041; H04R 2430/01
See application file for complete search history.

(56) References Cited

U.S. PATENT DOCUMENTS

2010/0332236 A1\* 12/2010 Tan .......................... G10L 15/26
704/E11.001
2012/0082321 A1\* 4/2012 Akaike ................ H04R 1/1041
381/74

(Continued)

FOREIGN PATENT DOCUMENTS

JP    2001-216069 A    8/2001
JP    2003-131785 A    5/2003
(Continued)

*Primary Examiner* — Daniel R Sellers
(74) *Attorney, Agent, or Firm* — Paratus Law Group, PLLC

(57) ABSTRACT

Provided is an information processing device, an information processing method, and a program, the information processing device including a control unit that dynamically controls output of notification information related to a function corresponding to a gesture regarding function execution of the device based on a recognition status of an operation body that is executing the gesture in a predetermined operation region.

17 Claims, 24 Drawing Sheets

(51) Int. Cl.
  *G06F 3/0354* (2013.01)
  *H04R 1/10* (2006.01)

(56) References Cited

U.S. PATENT DOCUMENTS

| | | | | |
|---|---|---|---|---|
| 2013/0265226 A1* | 10/2013 | Park | ............... | G06F 3/017 |
| | | | | 345/156 |
| 2013/0339859 A1* | 12/2013 | Hardi | ............ | G11B 27/105 |
| | | | | 715/740 |
| 2017/0212669 A1* | 7/2017 | Kim | ............ | G06F 3/04883 |
| 2017/0280223 A1* | 9/2017 | Cavarra | ............ | G06F 3/167 |
| 2018/0359553 A1* | 12/2018 | Mizuuchi | ............ | H04R 1/1041 |
| 2020/0145747 A1* | 5/2020 | Bunney | ............ | G06F 3/04883 |
| 2020/0205206 A1* | 6/2020 | Proschowsky | ....... | H04W 76/10 |

FOREIGN PATENT DOCUMENTS

| | | |
|---|---|---|
| JP | 2003-202877 A | 7/2003 |
| JP | 2007-087104 A | 4/2007 |
| JP | 2012-079082 A | 4/2012 |
| JP | 2012-162127 A | 8/2012 |
| JP | 2017-534132 A | 11/2017 |
| WO | WO 2012/132495 A1 | 10/2012 |

* cited by examiner

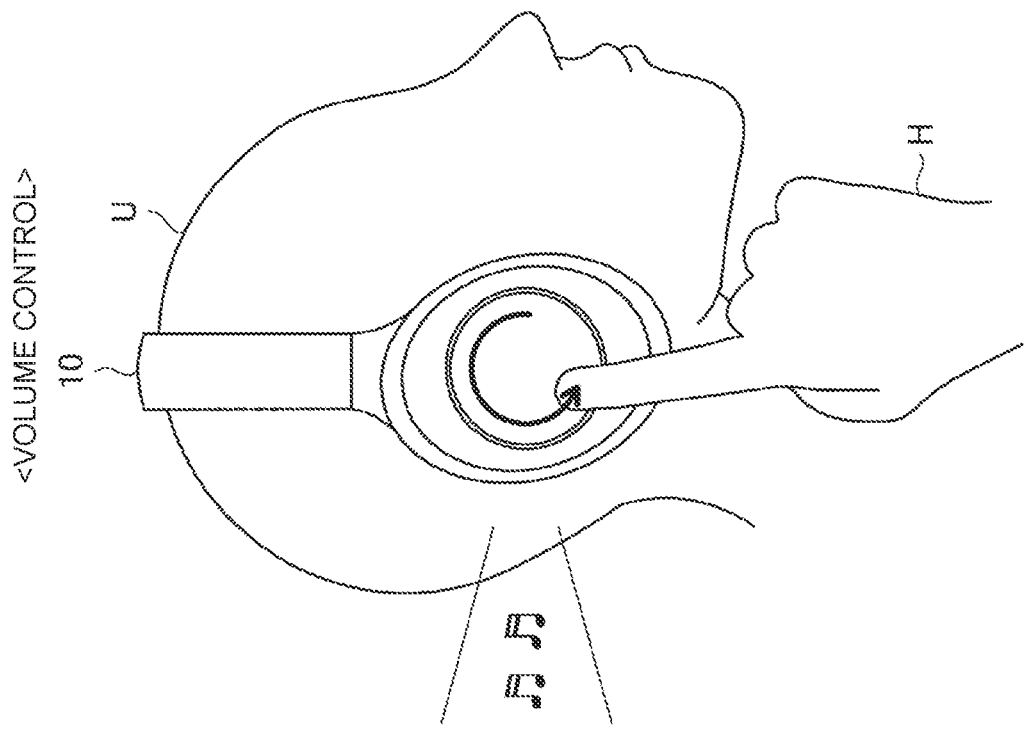
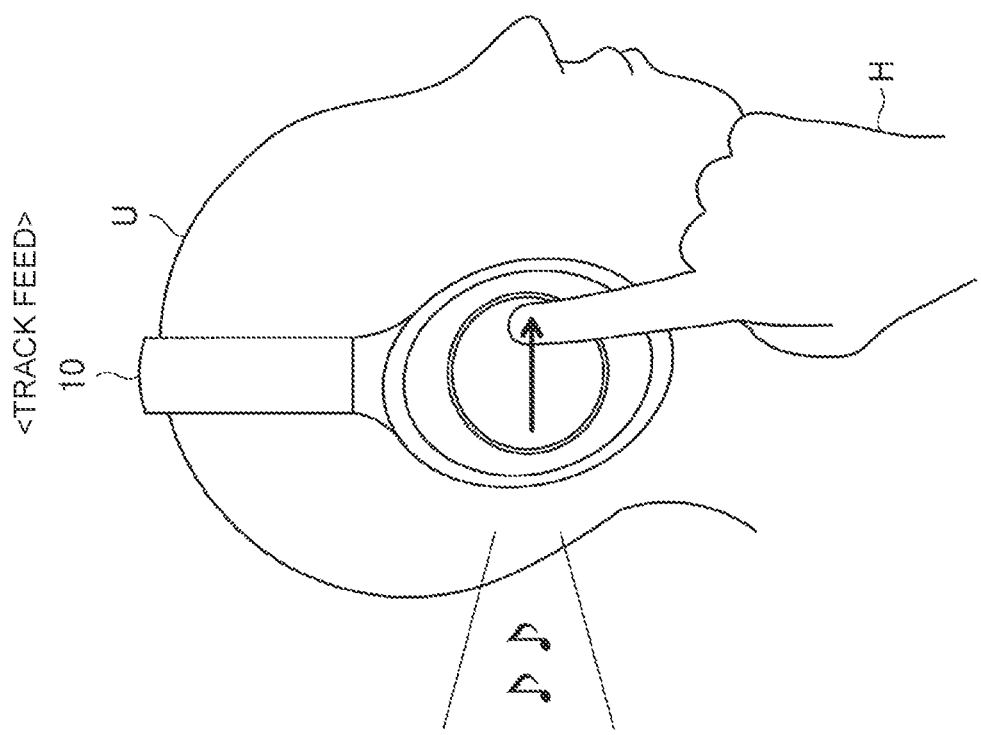

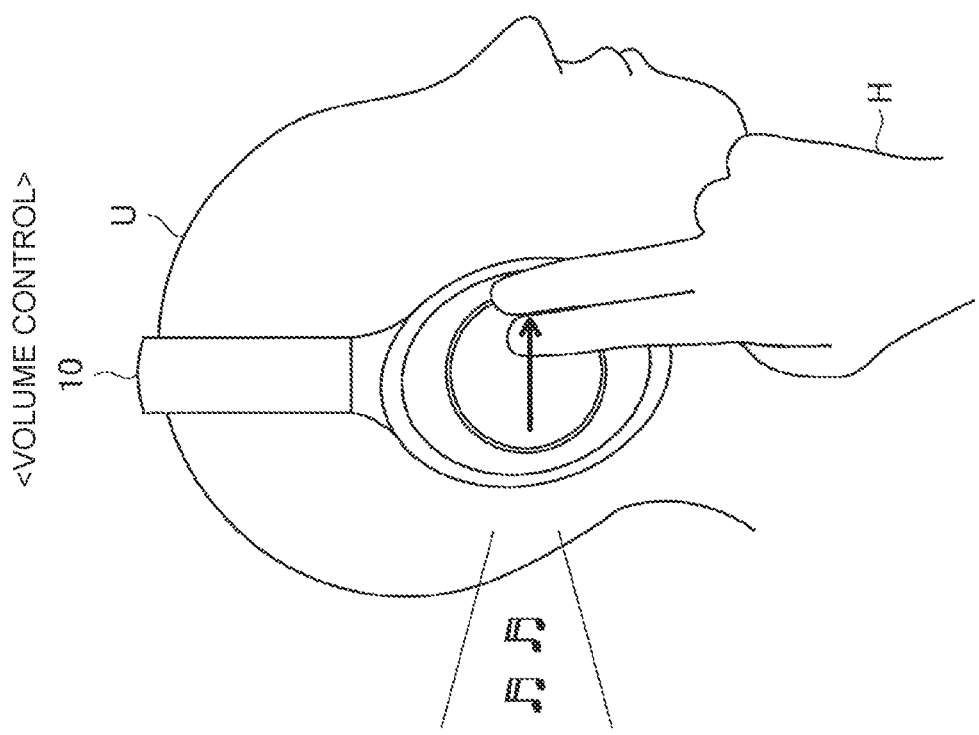
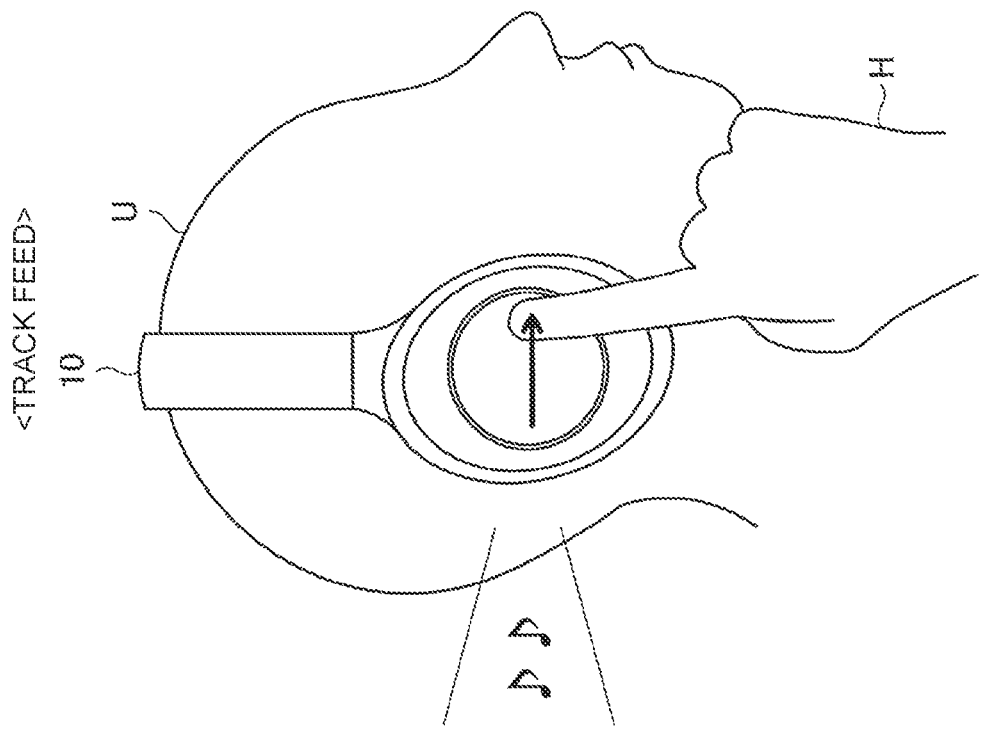
FIG.4

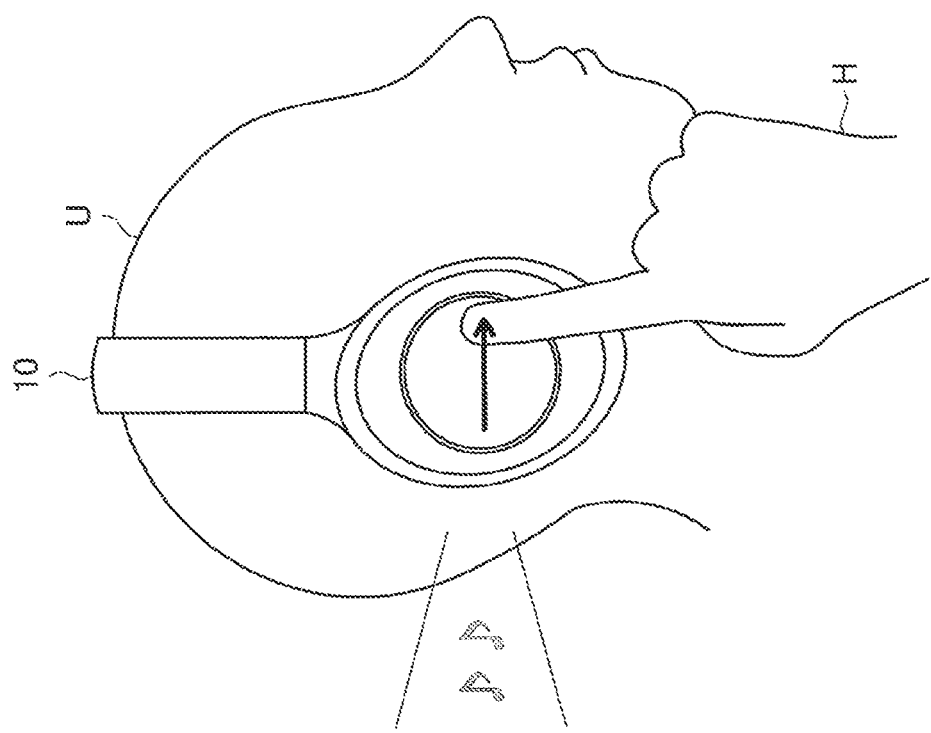
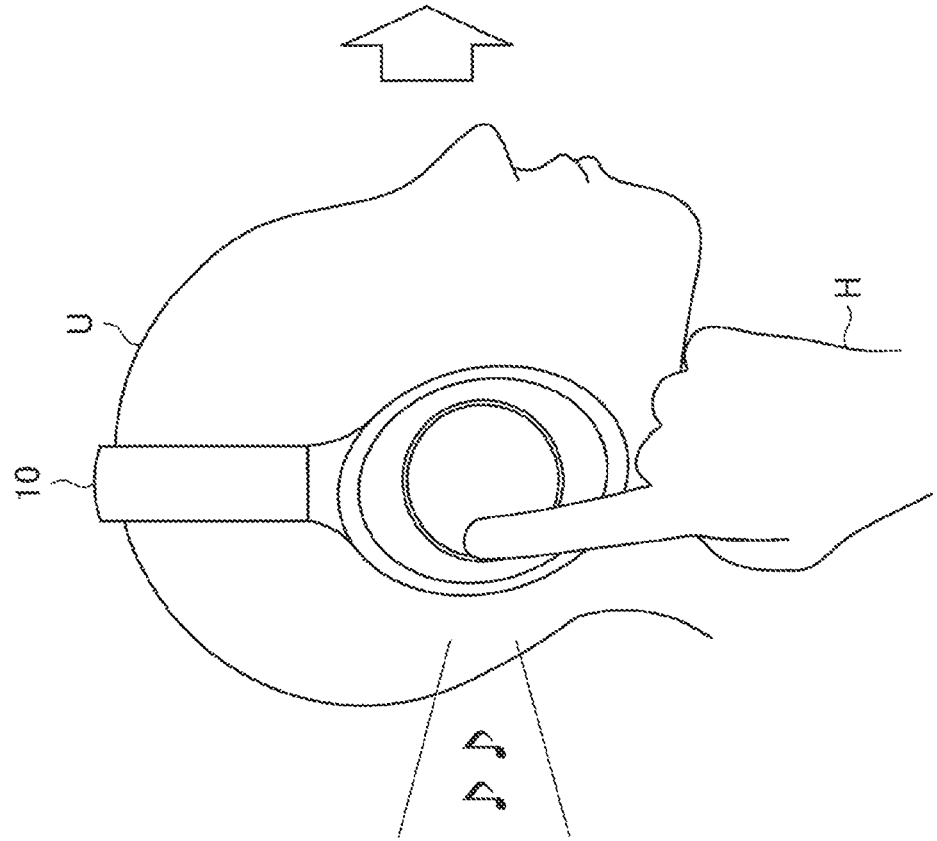
FIG.6

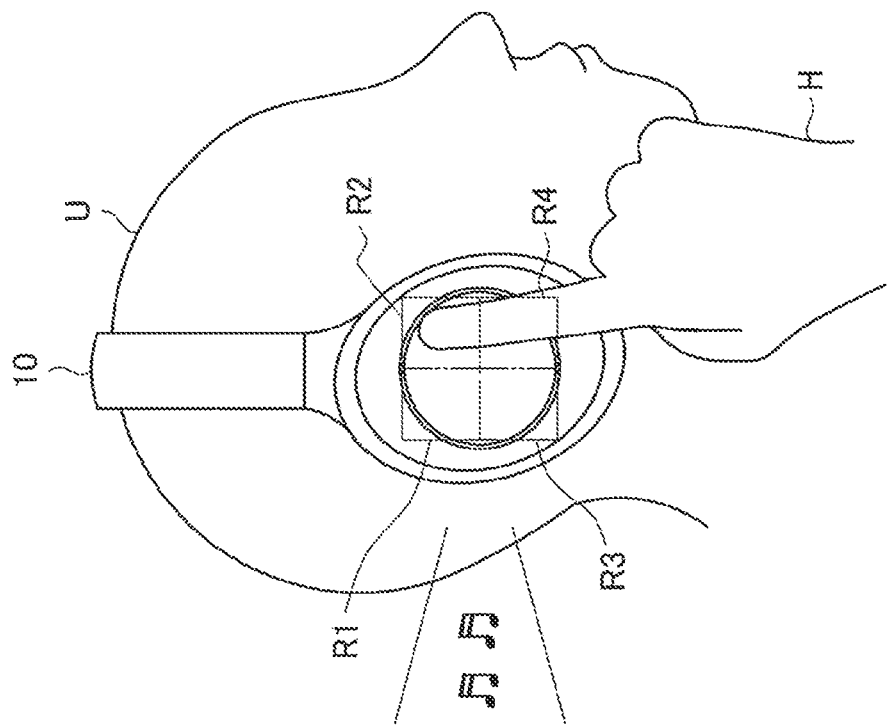
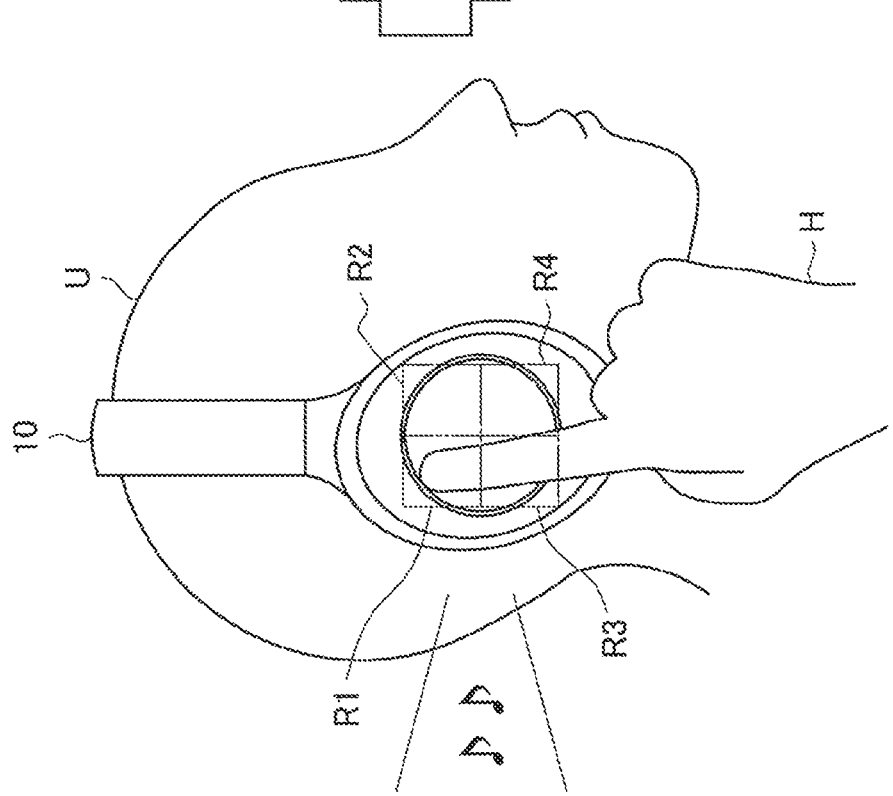
FIG.11

FIG.12
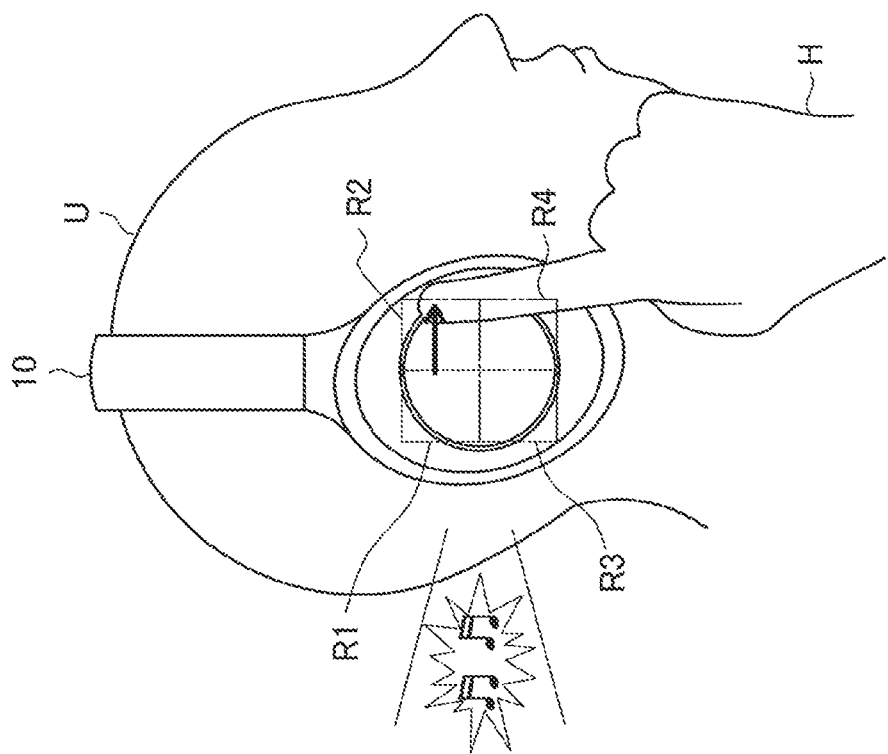
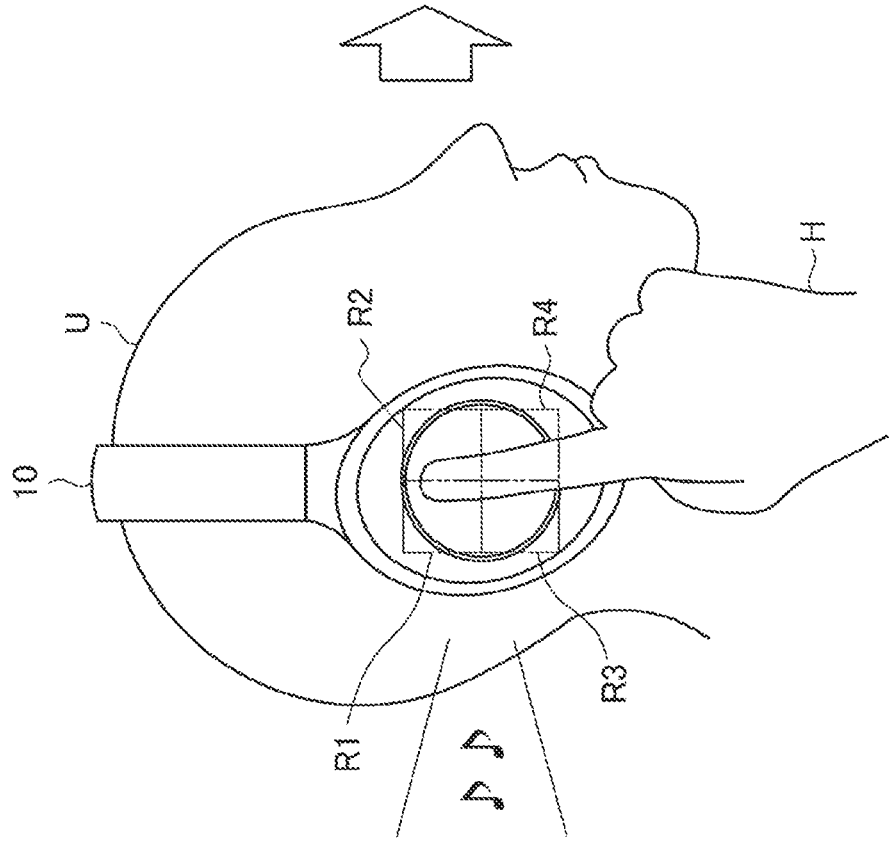

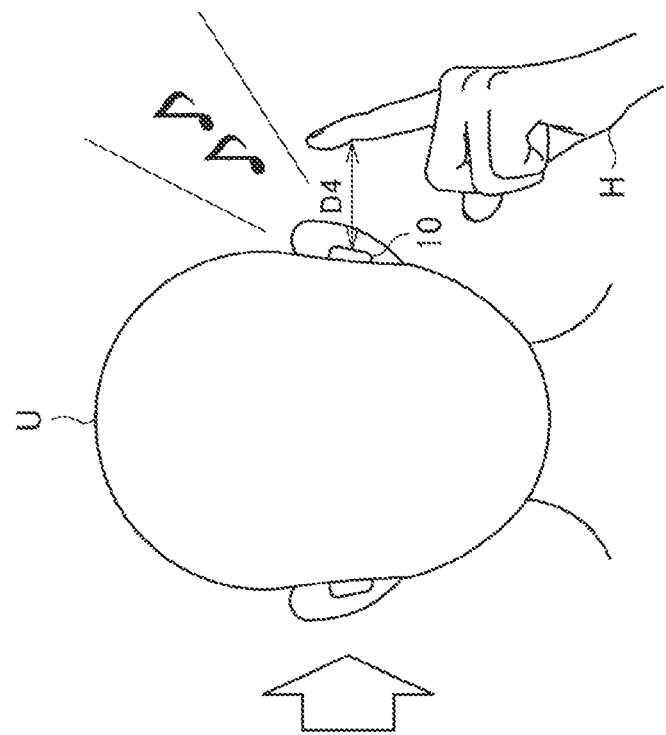
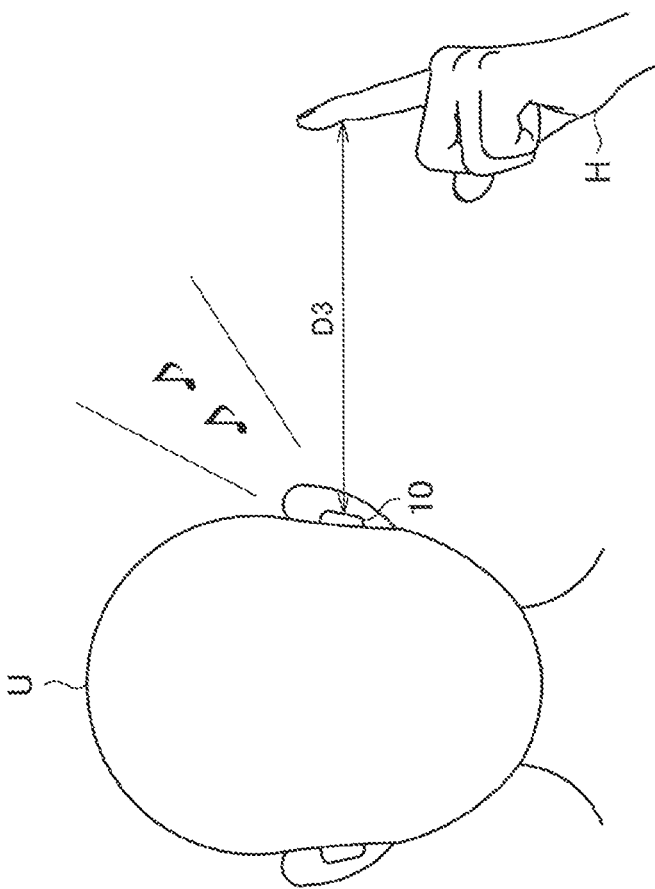
FIG.19

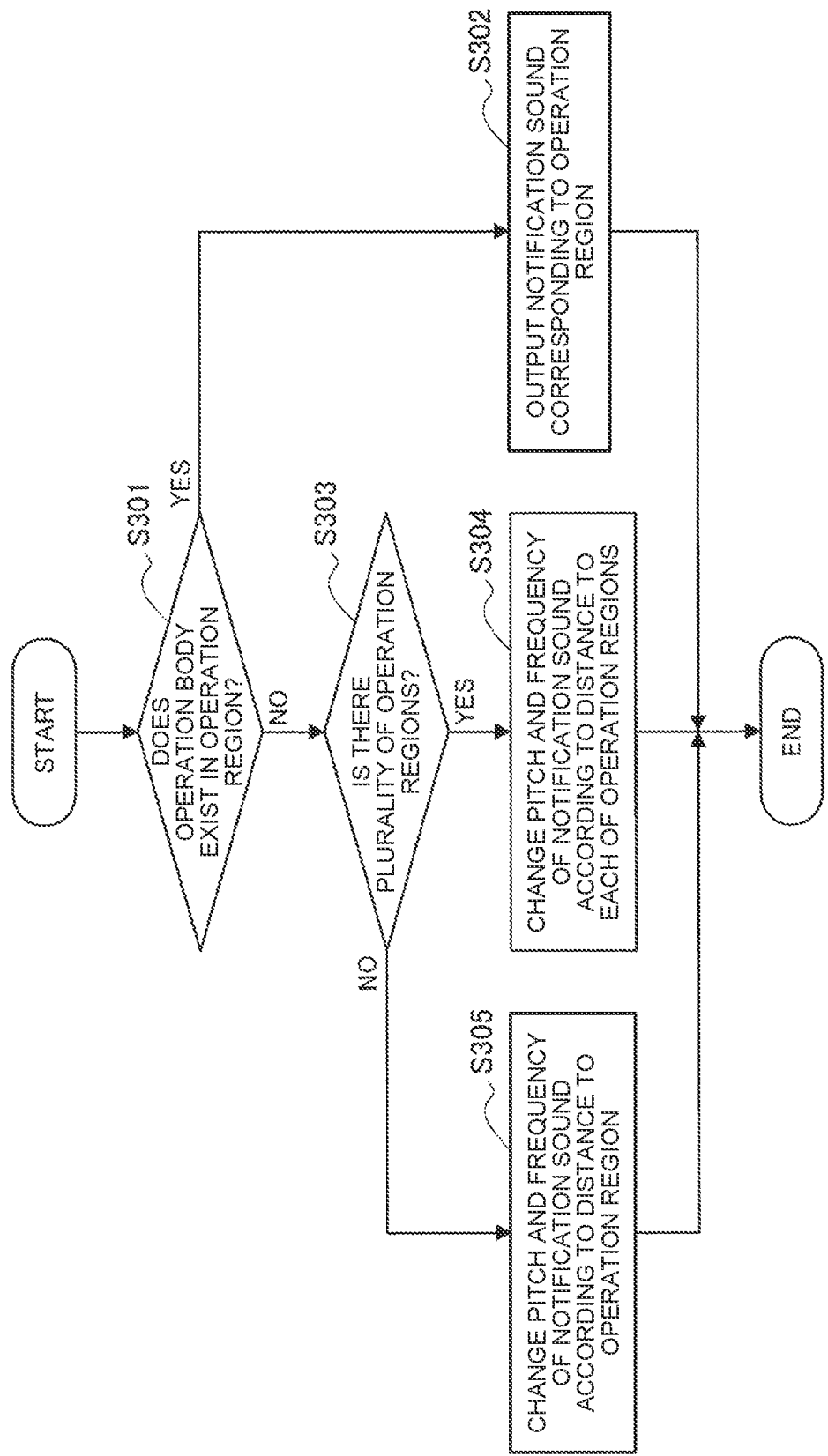

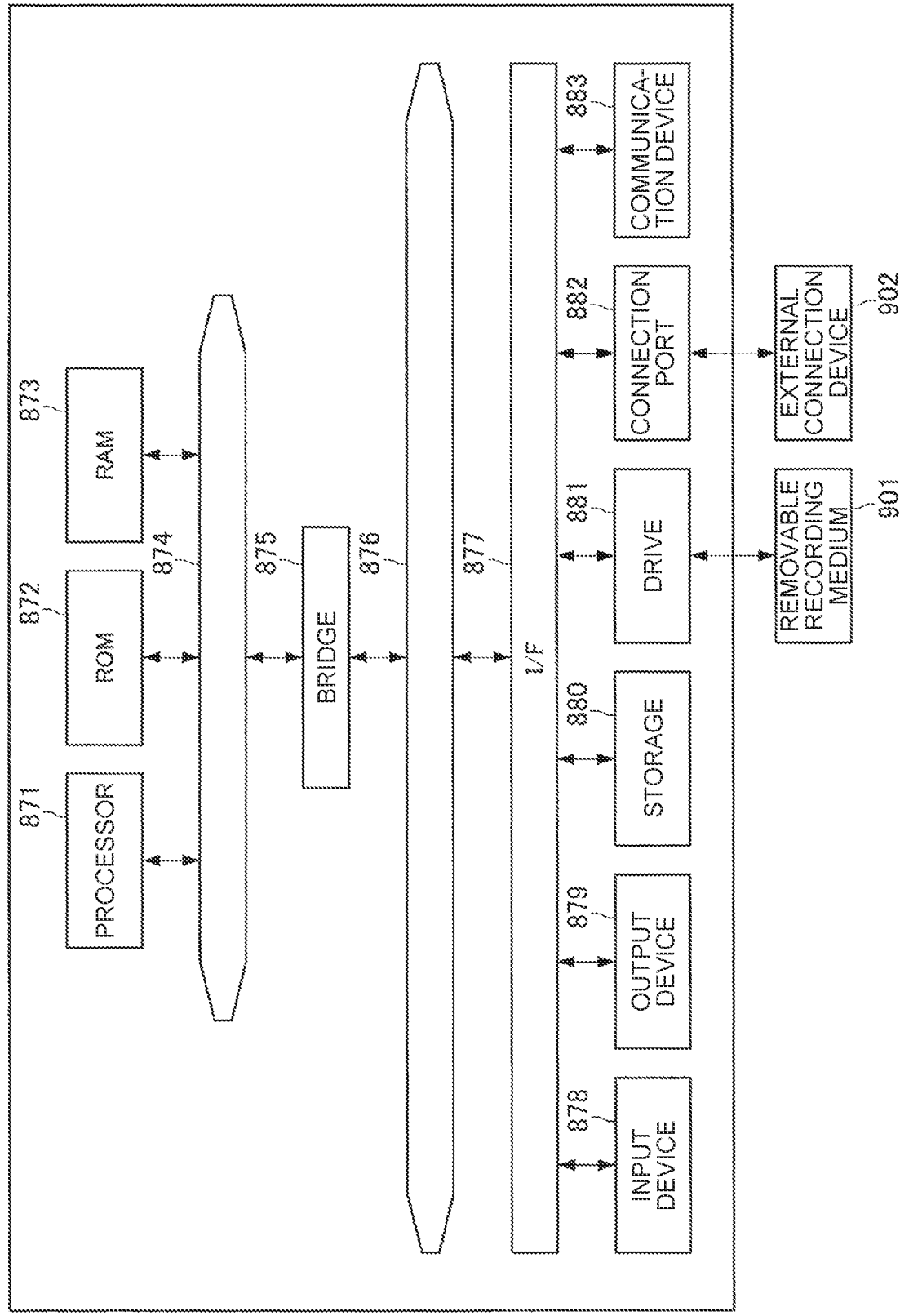

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2020/012787 (filed on Mar. 23, 2020) under 35 U.S.C. § 371, which claims priority to Japanese Patent Application No. 2019-069643 (filed on Apr. 1, 2019), which are all hereby incorporated by reference in their entirety.

FIELD

The present disclosure relates to an information processing device, an information processing method, and a program.

BACKGROUND

In recent years, techniques of outputting a sound corresponding to an operation onto a device or a state of the device have been developed. Patent Literature 1 discloses a technique of controlling output of a sound that allows a user to recall an operation on the device and a state of the device.

CITATION LIST

Patent Literature

Patent Literature 1: JP 2003-202877 A

SUMMARY

Technical Problem

In a device that is operated by execution of a gesture by an operation body such as a finger of a user, the user is not necessarily able to confirm whether a type of gesture intended by the user is recognized during the execution of the gesture. Nevertheless, the technique described in Patent Literature 1 has no consideration of confirmation of a recognition status of a gesture being executed.

Solution to Problem

According to the present disclosure, an information processing device is provided that includes a control unit that dynamically controls output of notification information related to a function corresponding to a gesture regarding function execution of the device based on a recognition status of an operation body that is executing the gesture in a predetermined operation region.

Moreover, according to the present disclosure, an information processing method to be executed by a processor is provided that includes dynamically controlling output of notification information related to a function corresponding to a gesture regarding function execution of a device based on a recognition status of an operation body that is executing the gesture in a predetermined operation region.

Moreover, according to the present disclosure, a program is provided that causes a computer to function as an information processing device that includes a control unit that dynamically controls output of notification information related to a function corresponding to a gesture regarding function execution of the device based on a recognition status of an operation body that is executing the gesture in a predetermined operation region.

BRIEF DESCRIPTION OF DRAWINGS

FIG. 3 is a diagram illustrating an example of output control regarding a notification sound based on a type of a gesture, performed by a control unit 130 according to the embodiment.

FIG. 4 is a diagram illustrating an example of output control of a notification sound based on how many fingers of a user are being used for an operation, performed by the control unit 130 according to the embodiment.

FIG. 6 is a diagram illustrating an example of output control of a notification sound based on a moving direction of an operation body, performed by the control unit 130 according to the embodiment.

FIG. 11 is a diagram illustrating an example of output control of a notification sound corresponding to an operation region in which an operation body is positioned, performed by the control unit 130 according to the embodiment.

FIG. 12 is a diagram illustrating an example of output control of a notification sound when an operation body is predicted to move to the outside of an operation region, performed by the control unit 130 according to the embodiment.

FIG. 19 is a diagram illustrating an example of execution control of functions related to the information processing terminal 10 based on a distance between an operation body and the information processing terminal 10 in a case where the distance is indicated as a recognition status, performed by the control unit 130 according to the embodiment.

FIG. 23 is a diagram illustrating an example of a flow of operations related to output control of a notification sound corresponding to an operation region, performed by the control unit 130 according to the embodiment.

FIG. 24 is a block diagram illustrating a hardware configuration example of an information processing terminal 10 according to an embodiment of the present disclosure.

DESCRIPTION OF EMBODIMENTS

Figure 1:
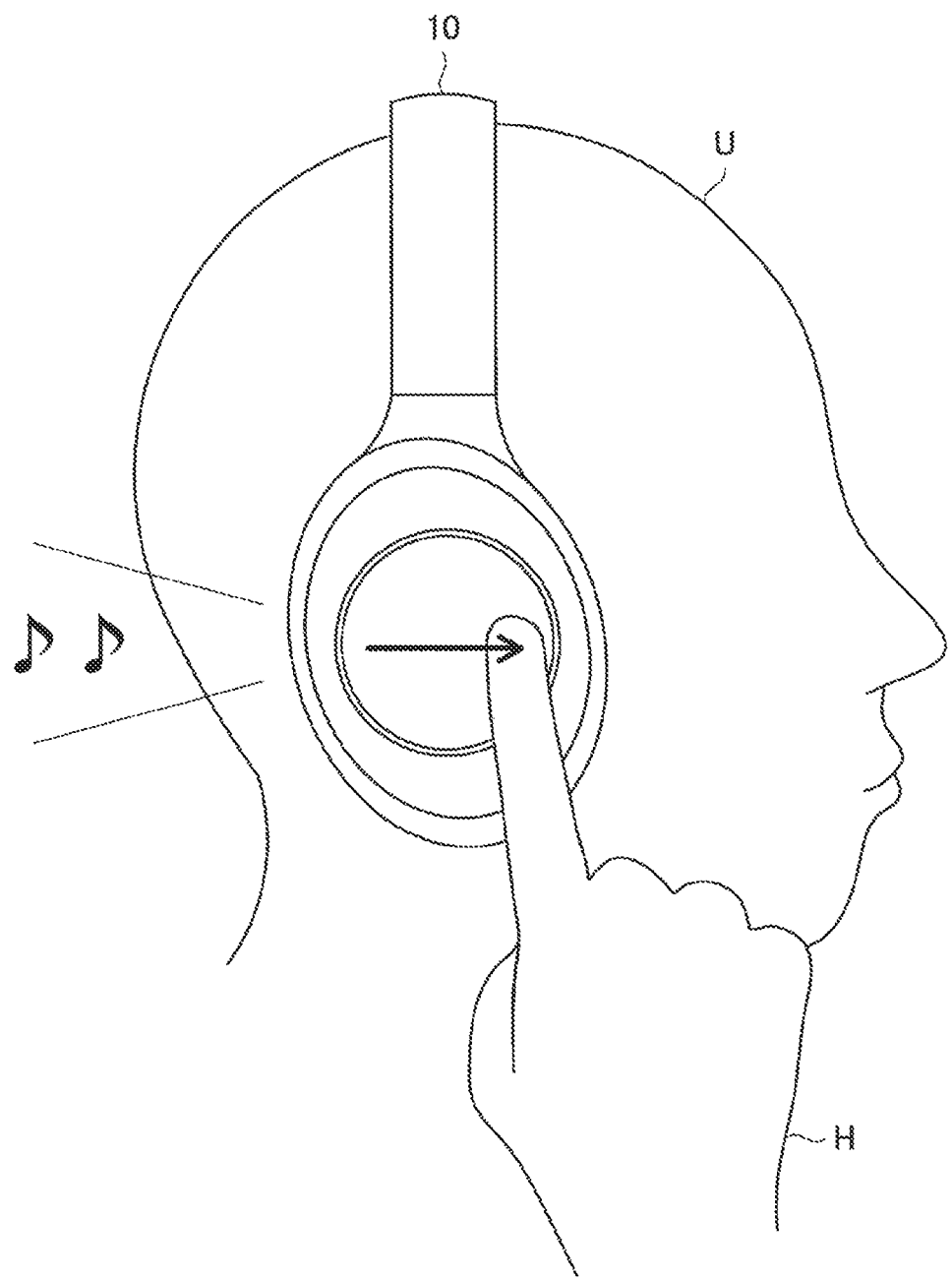
FIG. 1 is a diagram illustrating an outline of an information processing terminal according to the present disclosure.

Hereinafter, preferred embodiments of the present disclosure will be described in detail with reference to the accompanying drawings. In the present specification and the drawings, components having substantially the same functional configuration are denoted by the same reference numerals, and redundant description is omitted.

Note that the description will be given in the following order.
1. Outline
2. Embodiment
2.1. Functional configuration examples
2.2. Specific examples
2.2.1. Specific example 1
2.2.2. Specific example 2
2.2.3. Specific example 3
2.2.4. Specific example 4
2.2.5. Specific example 5
2.2.6. Specific example 6
3. Operation examples
4. Hardware configuration example
5. Summary 1. Outline First, an outline according to the present disclosure will be described. In recent years, there is a technology having been developed that directly operates on an information processing terminal such as headphones or earphones worn on ears of a user to output a sound, thereby allowing the terminal to execute a predetermined function. The technology makes it possible to execute, for example, processes of playing or stopping music based on a touch operation on an information processing terminal, which leads to the achievement of a simpler operation not requiring another device.

In addition, in another technology that has been developed, in a case where the terminal includes a proximity sensor, a corresponding function is executed based on a predetermined gesture executed by a user's hand on a real space detectable by the proximity sensor. The technology makes it possible to, for example, execute processes such as volume control based on a change in a distance in real space between the terminal and a hand of the user, leading to the achievement of simpler operation not requiring another device even in an earphone-type device on which direct touch operations would be difficult.

Unfortunately, however, the following situations might occur in the operation of the terminal according to the above technology.

First, there might be a situation in which an operation on the headphones or earphones worn on the user is executed at a position visually unrecognizable by the user, such as a side surface of the headphones (housing surfaces). This would make it difficult for the user to confirm whether the gesture being executed has been executed as intended. As a result, in a case where the type of gesture different from the gesture intended by the user is recognized by the terminal, there might be a situation in which the user notices that a different gesture has been recognized at a stage where the function different from the function desired by the user has been executed.

Furthermore, the user cannot grasp in which region of an operable region the user's own hand is positioned within the visually unrecognizable region. This leads to a situation in which the user cannot perform an intended operation. For example, in a case where the user starts a swipe operation from an end of a housing surface when performing a swipe operation in a predetermined direction on the housing surface having a touch panel in the headphones, there might occur a situation of having difficulty in performing an operation with a sufficient distance. Furthermore, in a case where the operation is performed based on a gesture in the space, the user U is not in contact with the terminal, making it more difficult for the user to grasp at which position in the space the user is performing the gesture.

The technical idea according to the present disclosure has been conceived in view of the above points, and is intended to make it possible to confirm success or failure of an operation or to perform a wider variety of operations in a region visually unrecognizable by the user.

Here, an outline of an information processing terminal 10 according to the present disclosure will be described with reference to FIG. 1. FIG. 1 is a diagram illustrating an outline of the information processing terminal according to the present disclosure. FIG. 1 illustrates the information processing terminal 10 being headphones worn on a user U.

When the information processing terminal 10 has recognized a predetermined gesture operation in a region where an operation can be performed on a housing surface by a hand H of the user U, which is an operation body, the information processing terminal 10 executes a function corresponding to the recognized operation. Here, the information processing terminal 10 can notify information related to a function corresponding to a gesture operation based on a recognition status of an operation body that is executing a predetermined gesture operation. Here, in the example illustrated in FIG. 1, the notification of the information can be executed by output of sound.

Furthermore, the information processing terminal 10 can recognize at which position in the operation region the hand H of the user U exists, and can output information corresponding to the operation region in which the hand H of the user U is positioned. Here, in the example illustrated in FIG. 1, the output of information can be executed by output of sound. In the following description, an example in which the information processing terminal 10 is implemented by headphones or earphones will be described.

2. Embodiment

2.1. Functional Configuration Examples

Figure 2:
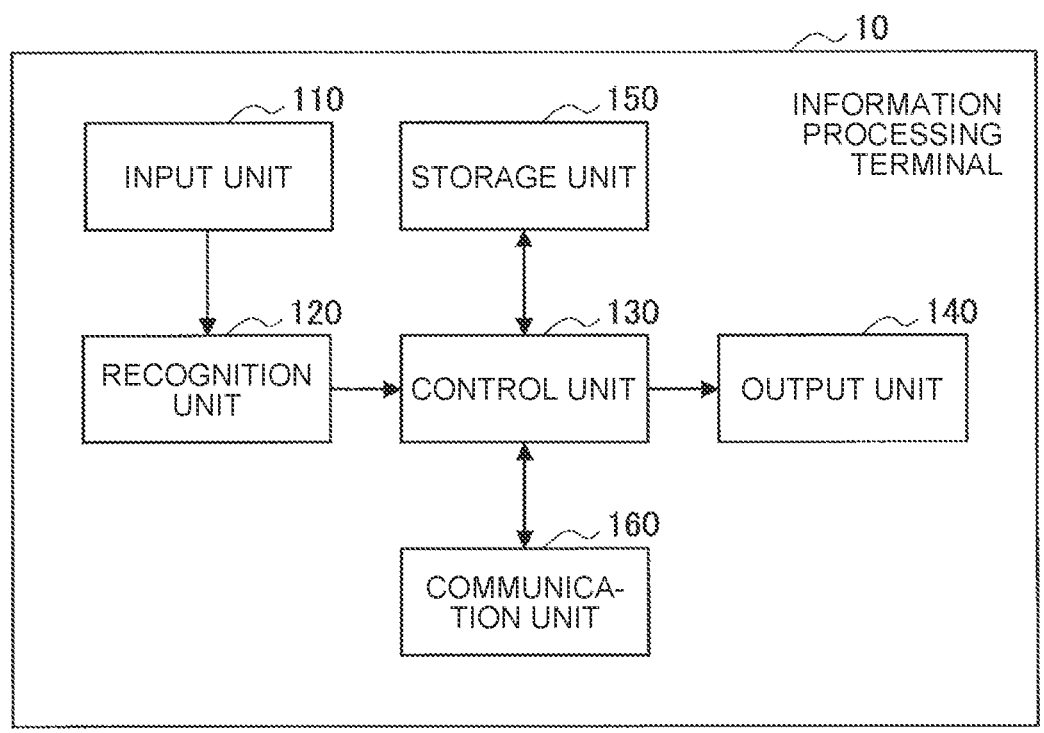
FIG. 2 is a diagram illustrating an example of a functional configuration of an information processing terminal 10 according to the present embodiment.

Next, an example of a functional configuration of the information processing terminal 10 according to the present embodiment will be described. FIG. 2 is a diagram illustrating an example of a functional configuration of the information processing terminal 10 according to the present embodiment. The information processing terminal 10 includes an input unit 110, a recognition unit 120, a control unit 130, an output unit 140, a storage unit 150, and a communication unit 160.

(Input unit 110)

The input unit 110 receives various types of information. The input unit 110 receives an operation input from a user, for example. The input unit 110 may include a touch pad on a housing surface and may receive a touch operation from the user, for example. The input unit 110 may detect contact made by an operation body with the touch pad. Furthermore, the input unit 110 may include a proximity sensor and detect an operation body in the real space. Hereinafter, a region used for the operation in the region where the input unit 110 can detect the operation body is also referred to as an operation region.

Note that the input unit 110 may include a microphone for inputting external sound. The external-sound signal input by the input unit 110 through the microphone can be used for an external sound removal process. The information received by the input unit 110 is transmitted to the recognition unit 120.

(Recognition Unit 120)

The recognition unit 120 executes various recognition processes based on the information transmitted from the input unit 110. The recognition unit 120 recognizes that a predetermined operation is being executed. Furthermore, the recognition unit 120 has a gesture recognition function. The recognition unit 120 can recognize various operations such as sliding operation on the touch pad or execution of a gesture on the real space that can be detected by the proximity sensor based on a detection result of the touch pad or the proximity sensor. The recognition result obtained by the recognition unit 120 is transmitted to the control unit 130 as a recognition status.

(Control Unit 130)

The control unit 130 controls individual components of the information processing terminal 10.

Furthermore, the control unit 130 may dynamically control output of the notification information related to the function corresponding to the gesture based on the recognition status of the operation body that is executing the gesture in the operation region. Here, as described above, the recognition status of the operation body is the recognition result obtained by the recognition unit 120. The control unit 130 controls the output of the notification information according to various statuses included in the recognition status. Here, the notification information is information related to a gesture being executed. The information related to the gesture being executed is, for example, information that allows the user U to understand the type of the gesture recognized by the recognition unit 120. The notification information is a notification sound, for example.

Although the following will describe an example in which the notification information is a notification sound, the notification information may be expressed by any information other than the sound information as a matter of course. Examples of the notification information include vibration information. The control unit 130 controls the output of the notification information based on the recognition status, enabling the user U to confirm whether the gesture is recognized as intended by the user U in a region visually unrecognizable by the user U.

Furthermore, the control unit 130 may control the output of the notification information related to the operation region in which the operation body is positioned based on the position of the operation body indicated by the recognition status. Here, examples of the notification information related to the operation region include information indicating whether the operation body is positioned in the operation region and information indicating in which operation region the operation body is positioned when there is a plurality of operation regions. As described above, the following will describe an example in which the notification information related to the operation region is the notification sound related to the operation region. The control unit 130 controls execution of a function corresponding to the operation region in which the operation body is positioned. Here, examples of the function include an output volume control function, a track feed function, and a track return function. The control unit 130 controls the output of the information of the operation region where the operation body is positioned, enabling the user U to confirm whether the user U is successfully performing the operation at the position intended by the user U.

Specific examples of the notification sound output control performed by the control unit 130 will be described below.

(Output Unit 140)

The output unit 140 outputs various types of information under the control of the control unit 130. The output unit 140 outputs sound by a driver unit, for example. An example of the sound output from the output unit 140 is the above-described notification sound. In addition, the output unit 140 executes a predetermined function under the control of the control unit 130. In addition, the output unit 140 may include an actuator and output the notification information by vibration.

(Storage Unit 150)

The storage unit 150 stores various types of information related to operations of the information processing terminal 10. The storage unit 150 may store sound source information used as a notification sound, for example.

(Communication Unit 160)

The communication unit 160 performs information communication with other devices. For example, the communication unit 160 receives sound information from other devices. The sound information received by the communication unit 160 is output to the user U by the output unit 140 via the control unit 130, for example. Furthermore, examples of the other devices include a music player, and a smartphone.

2.2. Specific Examples

Next, a specific example of the output control of the notification sound performed by the information processing terminal 10 according to the present embodiment will be described.

2.2.1. Specific Example 1

First, the control unit 130 may dynamically control the output of the notification sound based on the type of the gesture being executed by the operation body indicated by the recognition status. Here, the type of gesture refers to a type determined based on how the operation body has moved in the operation region, for example. In the case of headphones equipped with touch pads, examples of the type of gesture include a slide movement in a horizontal direction of an operation body on the touch pad and a rotational movement drawing a circle. Notifying the user U of the type of the gesture recognized by the recognition unit 120 by using the notification sound will enable the user U to confirm whether the gesture currently being executed is recognized by the information processing terminal 10 as an intended gesture. Furthermore, in a case where there is a function related to the information processing terminal 10 to be executed corresponding to the type of gesture, the user U can also confirm whether the gesture corresponding to the function intended to be executed is recognized.

Hereinafter, an example of output control of the notification sound based on the type of the gesture, performed by the control unit 130 according to the present embodiment, will be described with reference to FIG. 3. FIG. 3 is a diagram illustrating an example of the output control of a notification sound based on a type of a gesture, performed by the control unit 130 according to the present embodiment. FIG. 3 illustrates the information processing terminal 10 being headphones worn on the user U.

In the left illustration of FIG. 3, a hand H of the user U, which is an operation body, moves in the horizontal direction (flick movement) on the touch pad. With an indication that the hand H of the user U is moving in the horizontal direction according to the recognition status, the control unit 130 controls the output unit 140 to output a notification sound corresponding to the movement in the horizontal direction.

In the right illustration of FIG. 3, the hand H of the user U makes a rotational movement on the touch pad. With an indication that the hand H of the user U is in a rotational movement according to the recognition status, the control unit 130 controls the output unit 140 to output a notification sound corresponding to the movement in the horizontal direction. Here, the notification sound output by the output unit 140 is different from the notification sound output in the left illustration of FIG. 3.

In the example illustrated in FIG. 3, the notification sound is output based on the type of the gesture being executed. Alternatively, the control unit 130 may control the output of the notification sound based on how many fingers of the hand H of the user U are being used in executing the gesture. With this control, even during the execution of the similar gesture, it is possible to output the notification sound corresponding to how many fingers are being used, enabling confirmation whether the gesture is recognized with the fingers as many as intended by the user U.

Note that the control unit 130 may control to output the notification sound further based on a moving speed of the operation body that is executing the gesture. This control makes it possible to confirm the degree of change in a setting value and to execute more specific operation. Furthermore, in a case where the type of the gesture being executed cannot be specified, the control unit 130 may control to output a notification sound corresponding to the preliminary motion of the gesture until the type can be specified, and may control to output the notification sound based on the type of the gesture being executed at a stage where the type is successfully specified.

Hereinafter, an example of output control of the notification sound based on how many fingers of the user are being used, performed by the control unit 130 according to the present embodiment, will be described with reference to FIG. 4. FIG. 4 is a diagram illustrating an example of output control of the notification sound based on how many fingers of the user are being used, performed by the control unit 130 according to the present embodiment. FIG. 4 illustrates the information processing terminal 10 being headphones worn on the user U.

In the left illustration of FIG. 4, one finger of the hand H of the user U moves in the horizontal direction (flick movement) on the touch pad. Here, with an indication that the gesture is being executed with two fingers according to the recognition status, the control unit 130 controls the output unit 140 to output the notification sound corresponding to the movement in the horizontal direction.

In the right illustration of FIG. 4, two fingers of the hand H of the user U move in the horizontal direction on the touch pad. Here, with an indication that the gesture is being executed with two fingers according to the recognition status, the control unit 130 controls the output unit 140 to output the notification sound corresponding to the movement in the horizontal direction. Here, the notification sound output by the output unit 140 is different from the notification sound output in the left illustration of FIG. 4.

In this manner, the notification sound to be output changes based on the type of gesture being executed and how many fingers are being used in the execution of the gesture. Note that the control unit 130 may output the notification sound only in a case where the fingers of the user U as the operation body are as many as a predetermined number by the recognition status. For example, in the case of the example illustrated in FIG. 4, the control unit 130 may output the notification sound only in a case where it is indicated that the gesture is being executed with two fingers by the recognition status, for example, only while the touch pad is continuously touched with two fingers. This enables the user U to more precisely grasp how many fingers are being recognized.

Here, when the operation body moves in the operation region, the control unit 130 may dynamically control the output of the notification sound based on a moving direction of the operation body indicated by the recognition status. Specifically, the control unit 130 may control to change the output mode of the notification sound based on the moving direction of the operation body indicated by the recognition status. Examples of the output mode of the notification sound here include frequency, pitch, density, volume of the notification sound. With the notification sound output performed based on the moving direction of the operation body, the user U can confirm whether the operation body is moved as intended by the user U.

Figure 5:
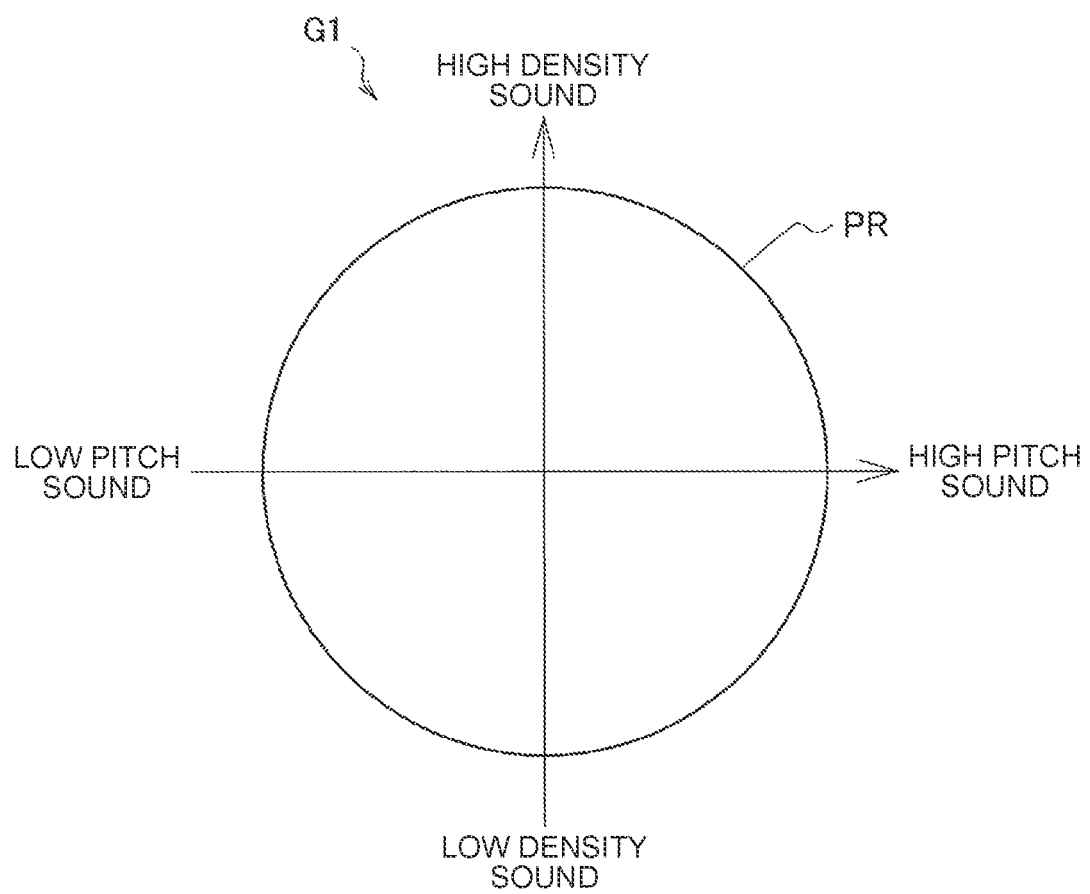
FIG. 5 is a diagram illustrating an example of output control of a notification sound based on a moving direction of an operation body, performed by the control unit 130 according to the embodiment.
Figure 7:
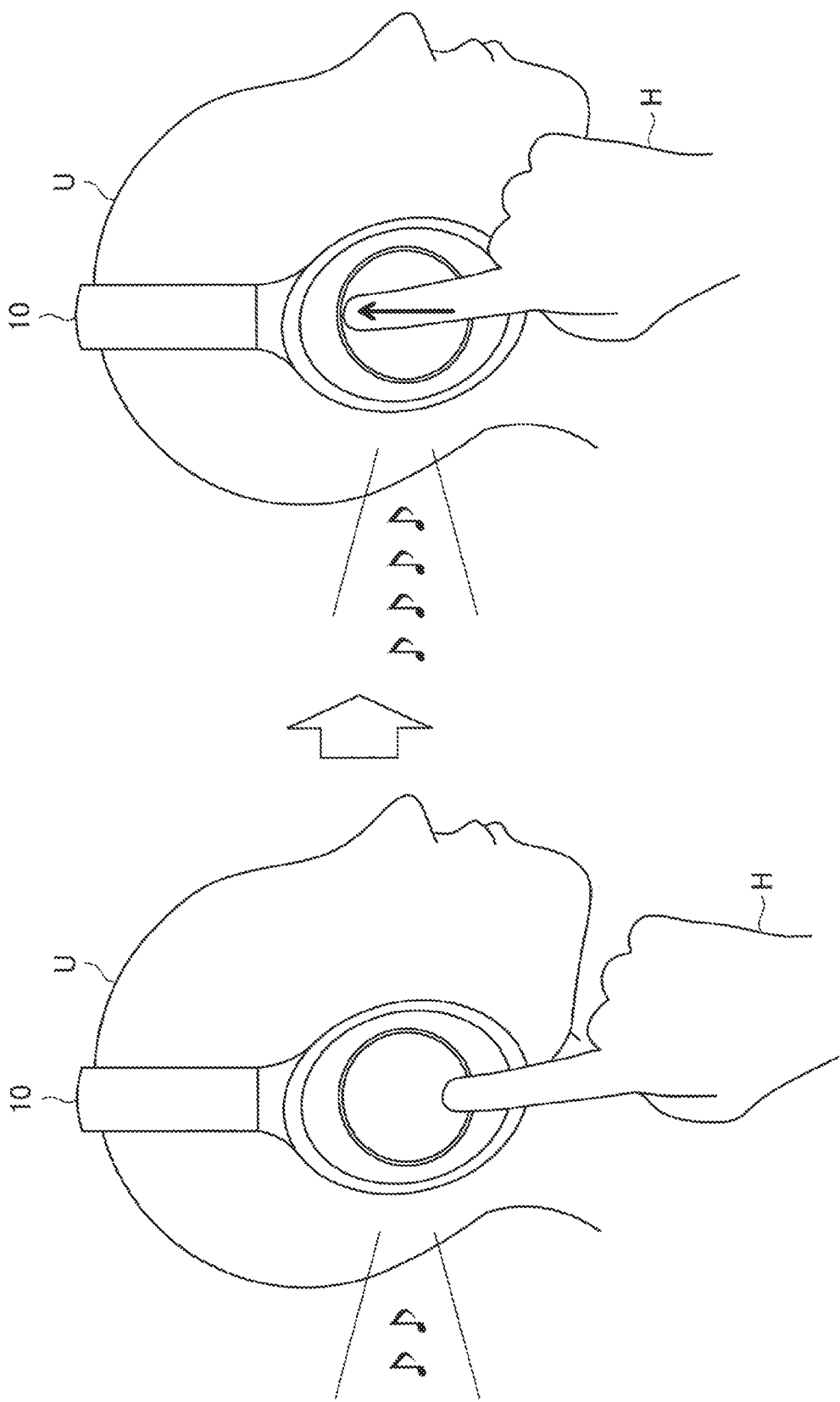
FIG. 7 is a diagram illustrating an example of output control of a notification sound based on a moving direction of an operation body, performed by the control unit 130 according to the embodiment.

Here, an example of output control of the notification sound based on the moving direction of the operation body by the control unit 130 according to the present embodiment will be described with reference to FIG. 5 to 7. FIGS. 5 to 7 are diagrams illustrating an example of output control of a notification sound based on the moving direction of an operation body, performed by the control unit 130 according to the present embodiment.

FIG. 5 illustrates a graph G1 representing a change in the notification sound based on the moving direction of the operation body. As illustrated in the graph G1, for example, it is allowable to set such that the pitch of the notification sound gradually increases as the operation body moves rightward while the pitch of the notification sound gradually decreases as the operation body moves leftward. In addition, as illustrated in the graph G1, for example, it is allowable to set such that the density of the sound output as the notification sound gradually increases as the operation body moves upward while the density of the sound output as the notification sound gradually decreases as the operation body moves downward. When the operation region is indicated as a region PR, the pitch or density of the notification sound may be determined based on the position of the operation body in the region PR. The control unit 130 may output the notification sound following the movement of the operation body.

FIGS. 6 and 7 illustrate the information processing terminal 10 being headphones worn on the user U. Here, as illustrated in FIG. 6, when the recognition unit 120 recognizes that the operation body is moving from the left side to the right side in the figure (from the rear side to the front side in practice) of the touch pad, the control unit 130 gradually increases the pitch of the notification sound. Furthermore, as illustrated in FIG. 7, in a case where the recognition unit 120 recognizes that the operation body is moving from the lower side to the upper side of the touch pad, the control unit 130 gradually increases the density of the notification sound.

In addition, the frequency, volume, and the like of the notification sound may be determined based on the moving direction of the operation body. In particular, when the notification sound includes a single sound source, the pitch and density of the notification sound may be determined based on the moving direction of the operation body. With the notification sound output with a single sound source, the user U can more easily grasp the change in the notification sound. For example, with a change in the number of repetitions of the output of a single sound source at the time of the operation of changing a predetermined setting value, the user U can more specifically grasp how the setting value has changed.

Figure 8:
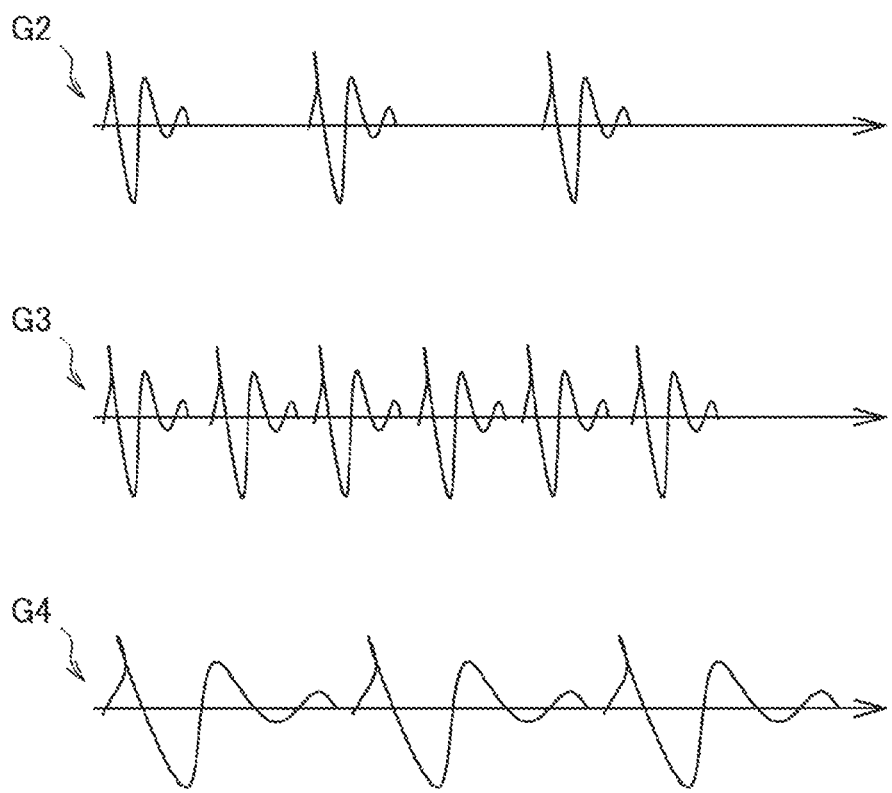
FIG. 8 is a diagram illustrating an example of a change in pitch and density of a notification sound by a single sound source according to the embodiment.

Here, an example of a change in pitch and density of the notification sound by a single sound source according to the present embodiment will be described with reference to FIG. 8. FIG. 8 is a diagram illustrating an example of a change in pitch and density of a notification sound by the single sound source according to the present embodiment. FIG. 8 includes graphs G2 to G4. In the graph G2, a single sound source repeatedly appears. In addition, in the graph G3, a single sound source having a higher density than that of the graph G2 repeatedly appears. In addition, in the graph G3, the pitch of the single sound source decreases as compared with the graphs G2 and G3.

2.2.2. Specific Example 2

Meanwhile, there exists a device such as a smartphone having a lock screen on which a function of unlocking the screen is executed when an operation body moves by a predetermined distance so as to unlock the lock screen by performing a swipe operation by a predetermined distance on a touch panel. Similarly, in the information processing terminal 10 according to the present embodiment, the control unit 130 may dynamically control the output of the notification sound based on a comparison between the moving distance of the operation body and a predetermined threshold. Specifically, the control unit 130 may dynamically control the output of the notification sound based on a difference between the moving distance of the operation body and a predetermined threshold. Here, the moving distance of the operation body is a moving distance of the operation body in the operation region, and the predetermined threshold may be a preliminarily defined value.

Figure 9:
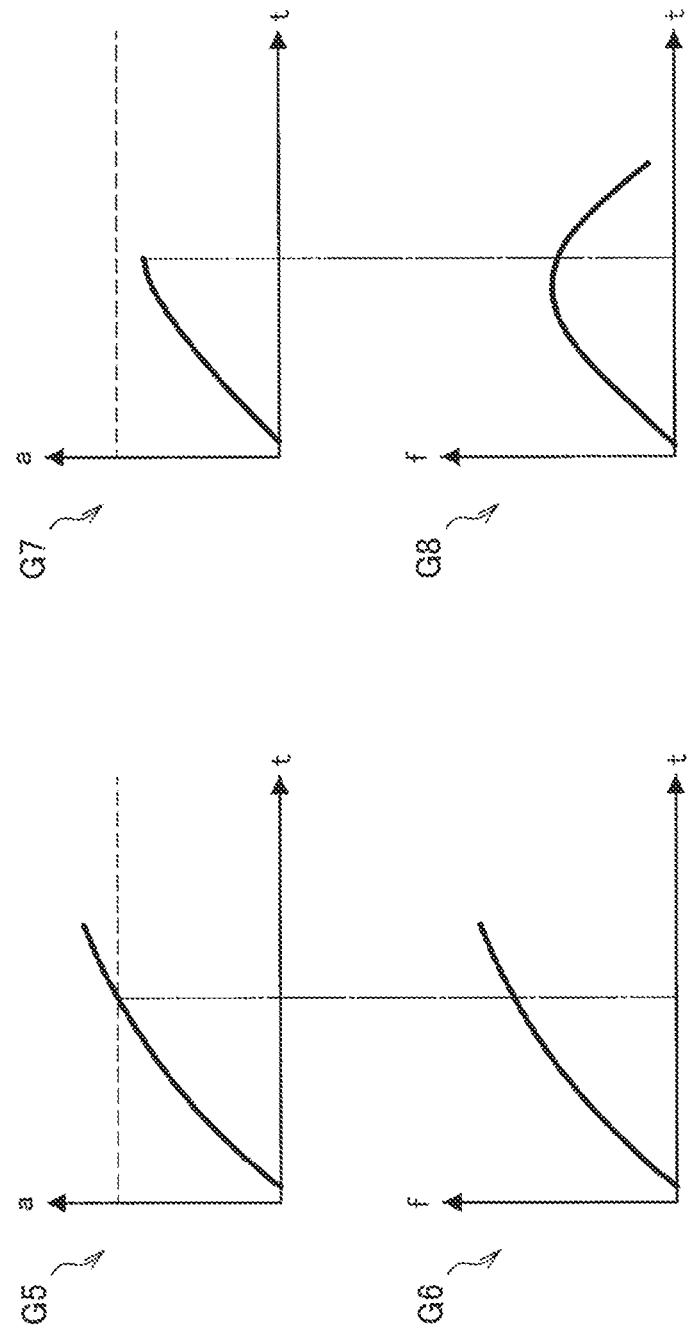
FIG. 9 is a diagram illustrating an example of output control of a notification sound based on a comparison between a moving distance of an operation body and a predetermined threshold, performed by the control unit 130 according to the embodiment.

Here, with reference to FIG. 9, an example of output control of a notification sound based on a comparison between a moving distance of an operation body and a predetermined threshold, performed by the control unit 130 according to the present embodiment will be described. FIG. 9 is a diagram illustrating an example of output control of a notification sound based on a comparison between a moving distance of an operation body and a predetermined threshold, performed by the control unit 130 according to the present embodiment. FIG. 9 illustrates a graph G5 indicating that the operation body has moved a predetermined distance or more and a graph G6 indicating the pitch of the notification sound corresponding to the graph G5. In addition, FIG. 9 illustrates a graph G7 indicating that the operation body stops moving before moving a predetermined distance or more and a graph G8 indicating the pitch of the notification sound corresponding to the graph G7.

In the graphs G5 and G7, the horizontal axis represents time and the vertical axis represents a position based on an initial position of the operation body. In the graphs G6 and G8, the horizontal axis represents time, and the vertical axis represents the pitch of the notification sound. As illustrated in the graphs G5 and G7, the pitch of the notification sound may gradually increase together with the movement of the operation body, and the pitch of the notification sound may similarly increase even after the moving distance exceeds a predetermined threshold. Note that the control unit 130 may execute a function related to the information processing terminal 10 in a case where the moving distance of the operation body exceeds a predetermined threshold.

In contrast, as illustrated in the graphs G6 and G8, while the pitch of the notification sound gradually increases together with the movement of the operation body, the operation ends before the moving distance exceeds a predetermined threshold. In such a case, as illustrated in the graph G8, the change in pitch of the notification sound may be the change from rise to fall. Here, the pitch of the notification sound may be substantially the same as the pitch of the notification sound at the moment when the operation body starts the operation. Note that the control unit 130 does not execute a similar function because the moving distance of the operation body does not exceed a predetermined threshold.

In comparison of the graph G6 and the graph G8, the pitch of the notification sound changes differently depending on whether the moving distance of the operation body exceeds a predetermined threshold. This makes it possible for the user U to intuitively grasp whether the corresponding function has been executed. Note that the output control of the notification sound described with reference to FIG. 9 is merely an example, and is not limited to such an example.

2.2.3. Specific Example 3

Furthermore, the control unit 130 may control the output of the sound related to the operation region in which the operation body is positioned, based on the position of the operation body indicated by the recognition status. That is, the control unit 130 may give feedback regarding the position of the operation body to the user U based on the position of the operation body indicated by the recognition status. For example, in a case where there is a plurality of operation regions, the control unit 130 may control the output of sound based on in which operation region the operation body is positioned.

Figure 10:
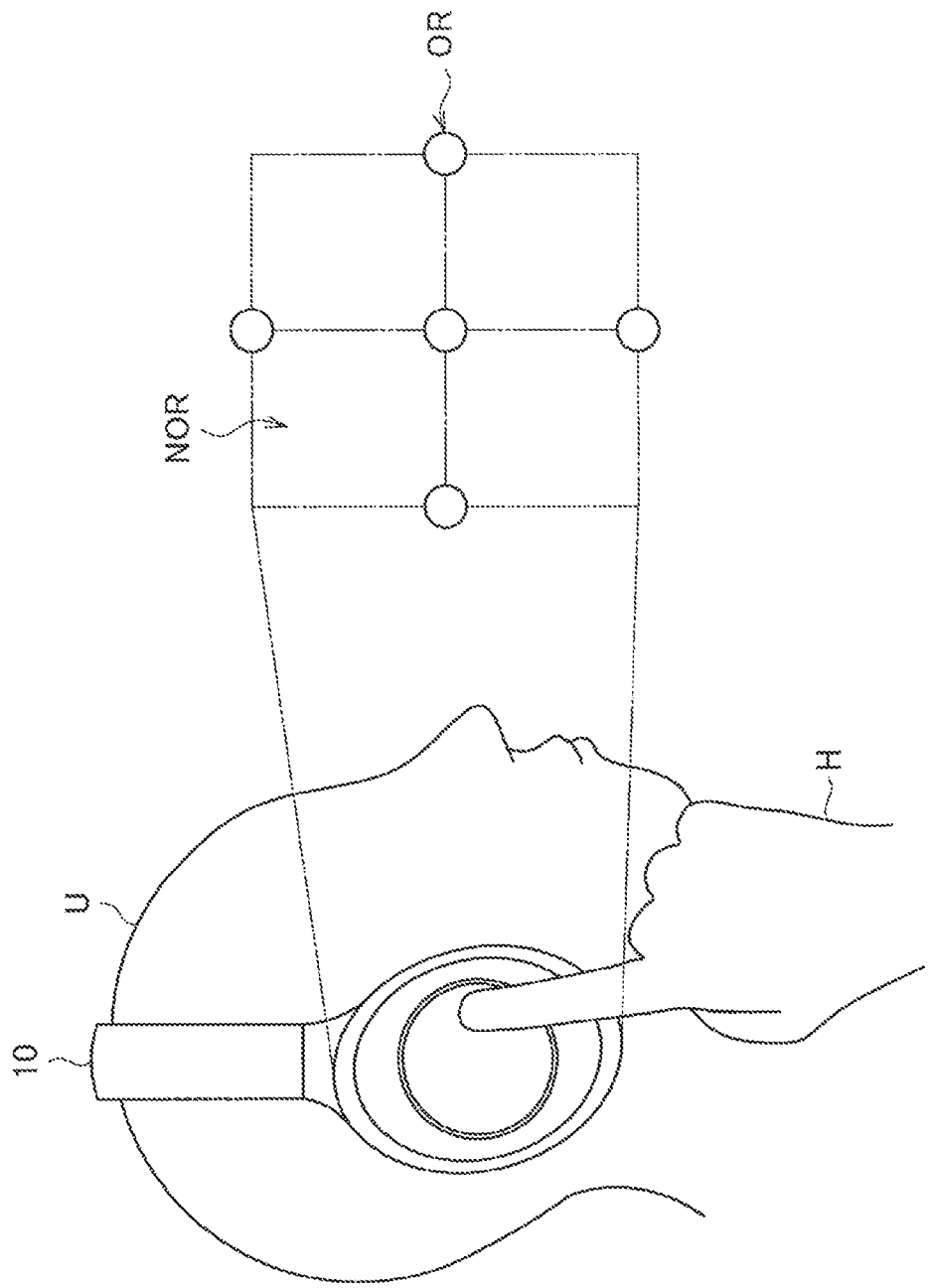
FIG. 10 is a diagram illustrating an example of an operation region according to the embodiment.

Here, an example of the operation region according to the present embodiment will be described with reference to FIG. 10. FIG. 10 is a diagram illustrating an example of an operation region according to the present embodiment. FIG. 10 illustrates the information processing terminal 10 being headphones worn on the user U, together with an operable region OR and a non-operable region NOR on a touch pad of the information processing terminal 10. Here, the operable region OR is a circular operation region where operation can be performed by the operation body and visually unrecognizable by the user U. FIG. 10 illustrates a case where there is a plurality of operable regions OR. When an operation is performed by an operation body in any of the operable regions OR, the control unit 130 may control execution of a function related to the information processing terminal 10 corresponding to the operable region OR. In contrast, the non-operable region NOR is a region where operation cannot be performed by the operation body. The arrangement and shapes of the operable region OR and the non-operable region NOR are not limited to such an example, as a matter of course.

As described above, the operation regions may exist in plurality and independently. In such a case, the control unit 130 may control the output of the sound corresponding to the operation region in which the operation body is positioned. Here, the sound to be output may be the above-described notification sound, for example. Here, an example of output control of the notification sound corresponding to the operation region in which the operation body is positioned, performed by the control unit 130 according to the present embodiment, will be described with reference to FIG. 11. FIG. 11 is a diagram illustrating an example of output control of the notification sound corresponding to the operation region in which the operation body is positioned, performed by the control unit 130 according to the present embodiment. FIG. 11 illustrates the information processing terminal 10 being headphones worn on the user U, and operation regions R1 to R4. The operation regions R1 to R4 are regions similar to the operable region OR illustrated in FIG. 10.

In the left illustration of FIG. 11, the hand H of the user U as the operation body is positioned in the operation region R1. With an indication that the hand H of the user U is positioned in the operation region R1 according to the recognition status, the control unit 130 controls the output unit 140 to output the notification sound corresponding to the operation region R1. In the right illustration of FIG. 11, the hand H of the user U as the operation body is positioned in the operation region R2. With an indication that the hand H of the user U is positioned in the operation region R2 according to the recognition status, the control unit 130 controls the output unit 140 to output the notification sound corresponding to the operation region R2. Here, the notification sound output by the output unit 140 is different from the notification sound output on the left illustration in FIG. 11. In this manner, in presence of a plurality of operation regions, the user U can grasp in which operation region the operation body is positioned without visual recognition.

Meanwhile, since the user U cannot visually recognize the operation region, there is a possibility that the operation body unintentionally moves to the outside of the operation region. To handle this, in a case where the operation body is predicted to move to the outside of the operation region by the recognition status, the control unit 130 may output a notification sound for notifying the prediction of the movement to the outside of the operation region.

Here, with reference to FIG. 12, an example of output control of a notification sound when an operation body is predicted to move to the outside of the operation region, performed by the control unit 130 according to the present embodiment, will be described. FIG. 12 is a diagram illustrating an example of output control of a notification sound when an operation body is predicted to move to the outside of the operation region, performed by the control unit 130 according to the present embodiment. FIG. 12 illustrates the information processing terminal 10 being headphones worn on the user U, and operation regions R1 to R4.

In the left illustration of FIG. 12, the hand H of the user U as the operation body is positioned in the operation region R1, similarly to the left illustration of FIG. 11. Here, the control unit 130 controls the output unit 140 to output a notification sound corresponding to the operation region R1. In the right illustration of FIG. 12, the hand H of the user U as the operation body is positioned in the operation region R2, which is moving outward from the operation region R2. In such a state, the control unit 130 controls to output a notification sound for notifying that the operation body is predicted to move to the outside of the operation region R2. The notification sound output in the right illustration of FIG. 12 may be a sound for warning that movement to the outside of the operation region is predicted. In this manner, the user U can correct the position of the operation body even in a case where the operation body is about to move to the outside of the operation region. Incidentally, it is also allowable to determine that the operation body is predicted to move to the outside of the operation region when the operation body is positioned at an end in the operation region regardless of the moving direction of the operation body.

2.2.4. Specific Example 4

The example in the above has described a case of the output control of the notification sound in a case where the number of operation regions is one. Alternatively, the control unit 130 may control the output of the notification sound related to a plurality of operation regions. Specifically, the control unit 130 may output a notification sound corresponding to each of operation regions based on the positional relationship between the operation body and each of the operation regions. For example, the control unit 130 may determine volume, pitch, frequency, and the like at the time of outputting the notification sound corresponding to each of the operation regions based on the positional relationship between the operation body and each of the operation regions. The volume, pitch, frequency, and the like of the notification sound may be determined based on the distance to each of the operation regions, for example. Furthermore, the control unit 130 may control the output of the notification sound so as to provide a guidance to a predetermined operation region.

Figure 13:
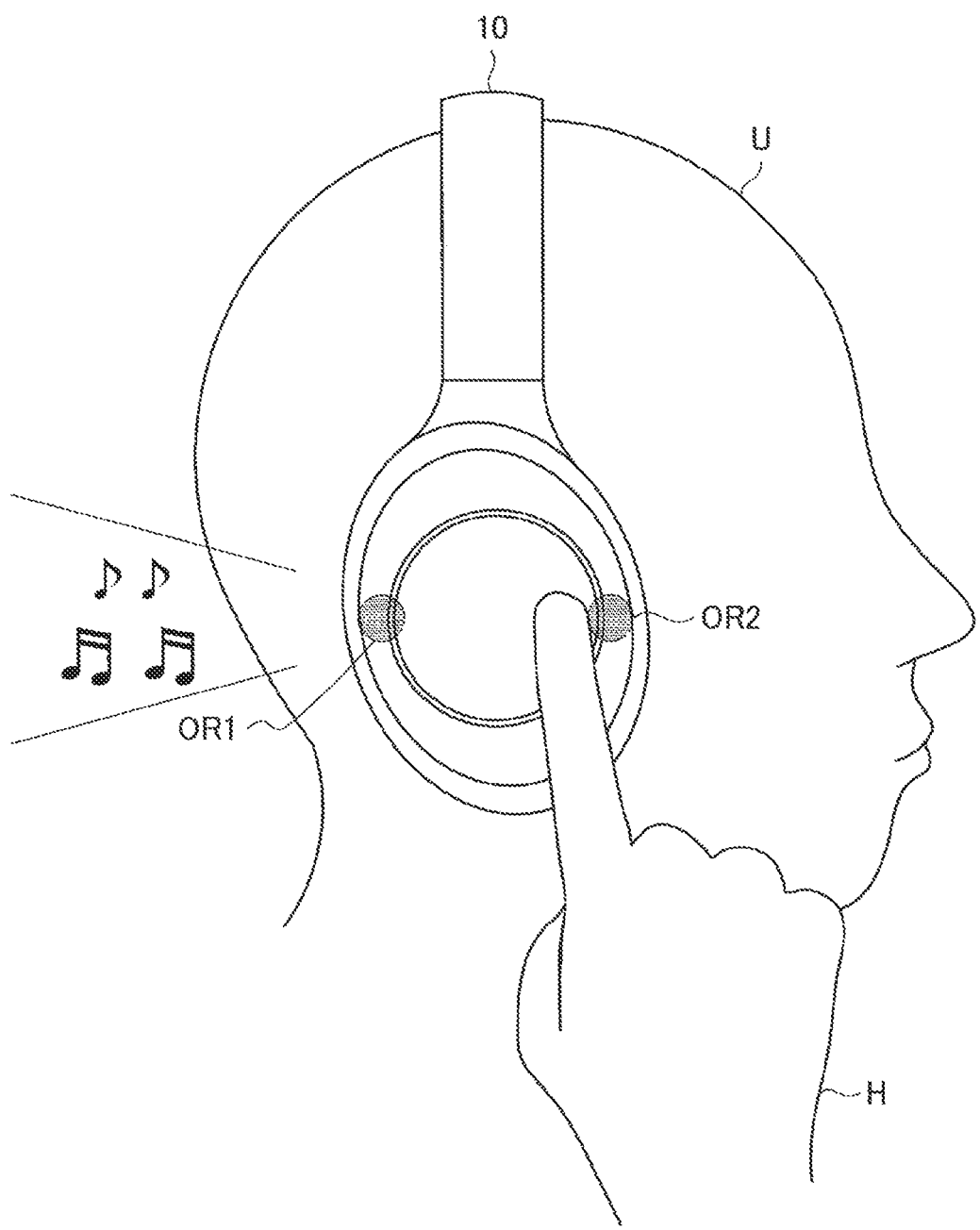
FIG. 13 is a diagram illustrating an example of output control of a notification sound corresponding to each of operation regions, performed by the control unit 130 according to the embodiment.

Here, an example of output control of the notification sound corresponding to each of the operation regions, performed by the control unit 130 according to the present embodiment, will be described with reference to FIG. 13. FIG. 13 is a diagram illustrating an example of output control of the notification sound corresponding to each of operation regions, performed by the control unit 130 according to the present embodiment. FIG. 13 illustrates the information processing terminal 10 being headphones worn on the user U, and operable regions OR1 and OR2.

The control unit 130 controls to output the notification sound such that the shorter the distance between the operation body and each of the operable regions OR1 and OR2, the higher the volume of the notification sound corresponding to each of the operable regions OR1 and OR2. In the example of FIG. 13, the position where the hand H of the user U is in contact with the touch pad is a position closer to the operable region OR2 rather than the operable region OR1. Accordingly, the control unit 130 controls to output the notification sound corresponding to the operable region OR2 at a volume higher than that of the operable region OR1.

In this manner, with a configuration to output the notification sounds related to the plurality of operation regions based on the positional relationship between each of operation regions and the operation body, the user U can grasp the relative positional relationship between the operation body and the plurality of operation regions.

In a case where the operation region includes the real space and the input unit 110 detects the operation body by the proximity sensor, the control unit 130 may output a notification sound corresponding to each of the operation regions based on the distance in the real space between the operation body and each of the operation regions.

Figure 14:
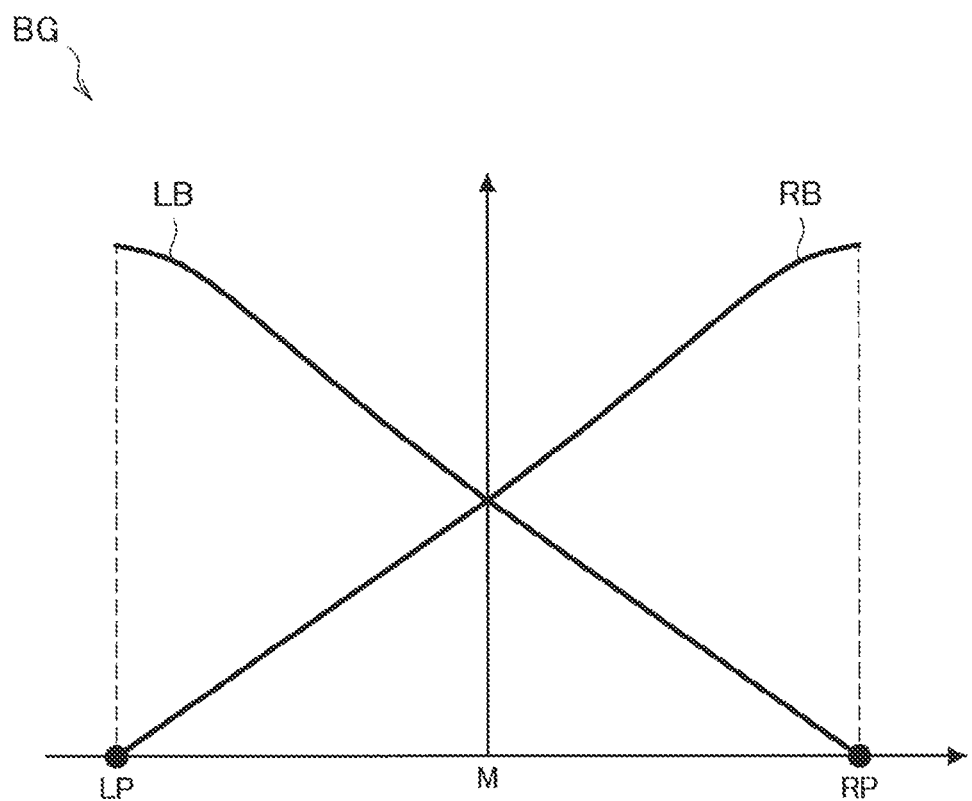
FIG. 14 is a diagram illustrating an example of output volume control of a notification sound corresponding to each of operation regions, performed by the control unit 130 according to the embodiment.

Here, an example of output volume control of the notification sound corresponding to each of the operation regions, performed by the control unit 130 according to the present embodiment, will be described with reference to FIG. 14. FIG. 14 is a diagram illustrating an example of output volume control of the notification sound corresponding to each of the operation regions, performed by the control unit 130 according to the present embodiment. FIG. 14 illustrates a graph BG in which the horizontal axis represents the position and the vertical axis represents the volume, and including boundary points LP and RP between the operation region and other regions. The boundary points LP and RP are boundary points with different operation regions, and a portion between the boundary points LP and RP is not an operation region. Furthermore, an intermediate point M is a point separated from the boundary point LP and the boundary point RP with an equal distance.

The graph BG illustrates volume LB of the notification sound corresponding to the boundary point LP and volume RB of the notification sound corresponding to the boundary point RP in a case where the operation body is positioned between the boundary points LP and RP. As illustrated in graph BG, the control unit 130 controls to output the notification sound such that the closer the position of the operation body is to each of the boundary points, the louder the volume. Note that the sum of the volume LB of the notification sound corresponding to the boundary point LP and the volume RB of the notification sound corresponding to the boundary point RP is set to be constant so that the user U can easily recognize the volume change in each of the notification sounds. When the operation body is positioned at the intermediate point M, the volume of each of the notification sounds is half the maximum value.

In this manner, the volume of the plurality of notification sounds corresponding to the distance between the operation body and the plurality of operation regions changes simultaneously, whereby the user U can more intuitively grasp the position of the operation body.

Meanwhile, the control unit 130 may control to change the information to be notified by the notification sound based on the positional relationship between the operation body and a group of the plurality of operation regions. For example, in a case where the operation body is positioned between a plurality of operation regions, the control unit 130 may output a notification sound as illustrated in FIG. 14. On the other hand, for example, in a case where the operation body is positioned in a region outside the region where the plurality of operation regions exists, moving the hand H of the user U to the region where the plurality of operation regions exists can be prioritized. Therefore, the control unit 130 may output a notification sound that notifies that the operation body is positioned outside the plurality of operation regions.

Figure 15:
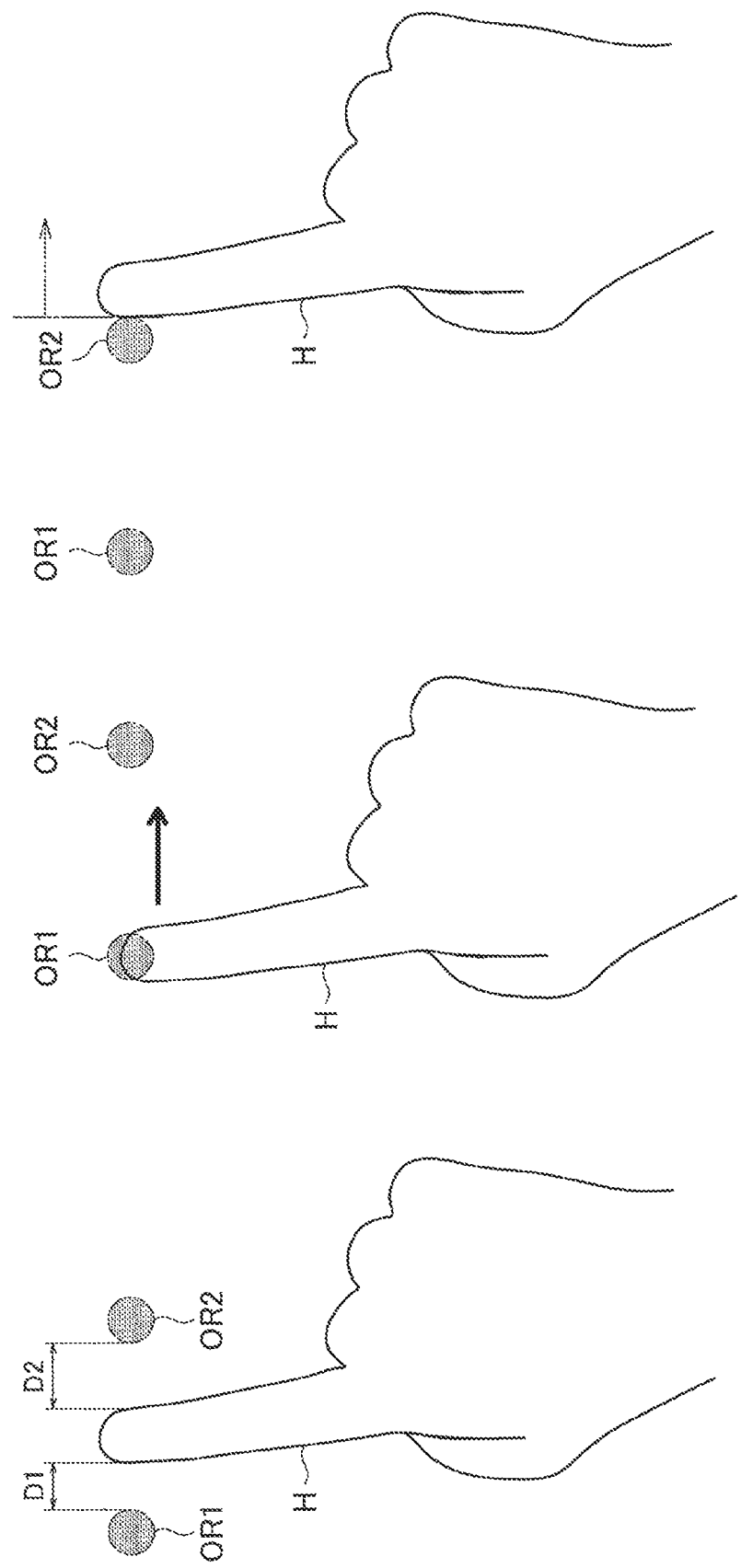
FIG. 15 is a diagram illustrating a positional relationship between an operation body and a plurality of operation regions and output control related to the positional relationship according to the embodiment.

Here, a positional relationship between an operation body and a plurality of operation regions and output control related to the positional relationship according to the present embodiment will be described with reference to FIG. 15. FIG. 15 is a diagram illustrating an example of a positional relationship between an operation body and a plurality of operation regions according to the present embodiment. FIG. 15 illustrates the hand H of the user U and the operable regions OR1 and OR2.

In the left illustration of FIG. 15, the hand H of the user U is positioned between the operable regions OR1 and OR2, and thus, the control unit 130 controls to output a notification sound corresponding to each of the operation regions based on the positional relationship between the operation body and each of the operation regions. In the middle illustration of FIG. 15, the hand H of the user U is positioned in the operable region OR1, and thus, the control unit 130 controls to output only the notification sound corresponding to the operable region OR1. In the right illustration of FIG. 15, the hand H of the user U is positioned outside the operable regions OR1 and OR2, and thus, the control unit 130 controls to output a notification sound that notifies that the hand H is positioned outside the operable regions OR1 and OR2, which is different from the notification sound output at the position of the operation body in the left illustration of FIG. 15.

As described above, with the change in the notification sound output based on the positional relationship between the operation body and the plurality of operation regions, the user U can operate the terminal more comfortably.

Incidentally, the control unit 130 may notify the user U by sound only when the operation body is positioned outside the operable regions OR1 and OR2. This would make it possible to reliably warn the user U in a case where the operation body significantly deviates from a plurality of operation regions. The notification can be applied as a warning with higher reliability even when the information processing terminal 10 is a head mounted display (HMD).

2.2.5. Specific Example 5

Meanwhile, when the user U performs an operation with the operation body in a visually unrecognizable region, operability can be improved with a capability of grasping a region (or point) as a reference. For example, when the user U cannot grasp the position of own hand H, returning the position of the hand H to the region as reference would enable grasping the position of the hand H for a moment. Therefore, in a case where the operation body is recognized as being positioned in a reference region defined as a reference in the operation by the operation body, the control unit 130 may control the output of the notification sound corresponding to the reference region.

Figure 16:
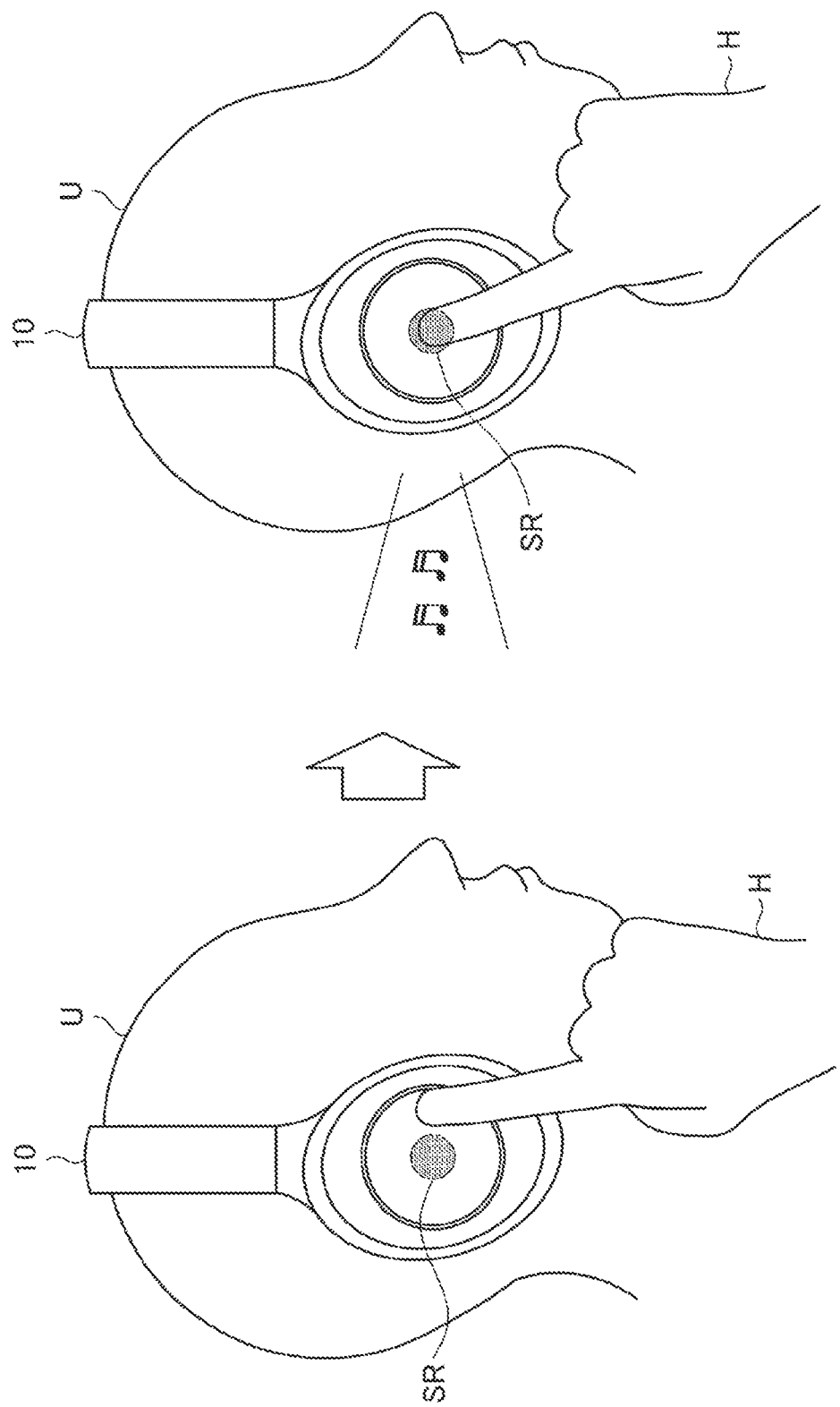
FIG. 16 is a diagram illustrating an example of output control of a notification sound related to a reference region, performed by the control unit 130 according to the embodiment.

Here, an example of output control of the notification sound related to the reference region, performed by the control unit 130 according to the present embodiment, will be described with reference to FIG. 16. FIG. 16 is a diagram illustrating an example of output control of the notification sound related to the reference region, performed by the control unit 130 according to the present embodiment. FIG. 16 illustrates the information processing terminal 10 being headphones worn on the user U, and a reference region SR. In FIG. 16, the reference region SR is a preliminarily defined region and is a region suitable as an operation starting region.

In the left illustration of FIG. 16, the hand H of the user U as the operation body moves (flick movement) in the horizontal direction on the touch pad. The control unit 130 grasps that the hand H of the user U is positioned outside the reference region SR. Here, since the hand H of the user U is not positioned in the reference region, the notification sound is not output.

In contrast, in the right illustration of FIG. 16, the hand H of user U is positioned in the reference region SR. With an indication that the hand H of the user U is positioned in the reference region SR according to the recognition status, the control unit 130 controls to output a notification sound corresponding to the reference region SR.

In this manner, with the control by the control unit 130 to output the notification sound corresponding to the reference region SR, the operation can be started at the reference point, enabling the operation with higher accuracy.

In the example illustrated in FIG. 16, the control unit 130 does not output the notification sound when the operation body is not positioned in the reference region SR. Alternatively, however, the control unit may output a notification sound as a guidance to the reference region SR. For example, when performing a slide operation continuously in a predetermined direction, with a procedure in which the operation body once performs the slide operation in the predetermined direction, thereafter the operation body returns to the reference region SR and then performs the slide operation in the same direction again, it would be possible to avoid a situation in which the operation body deviates from the operation region, enabling operations with higher reliability. Note that the guidance to the reference region SR by the notification sound is implemented by the methods illustrated in FIGS. 13 to 15, for example. In addition, the reference region SR is not limited to the size as illustrated in FIG. 16.

In the example illustrated in FIG. 16, the reference region SR exists at a preliminarily defined position. However, for the user U having a habit of performing an operation only at a biased portion in the operation region, the reference region SR would not necessarily facilitate the operation. Therefore, the position of the reference region SR may be determined depending on the user U. Specifically, regarding the reference region SR, the position where the operation is first started by the user U in the operation region may be determined as the reference region SR. This makes it possible to implement more comfortable operation corresponding to the habit of the operation of each of the users U.

Note that the "portion where the operation is first started" refers to a position where an operation body for executing one function is positioned first on the operation region, for example. Alternatively, the "portion where the operation is first started" may be a position where the operation body for continuously performing a plurality of operations is positioned first on the operation region, for example. The definition of the "portion where the operation is first started" is not limited to such an example.

Figure 17:
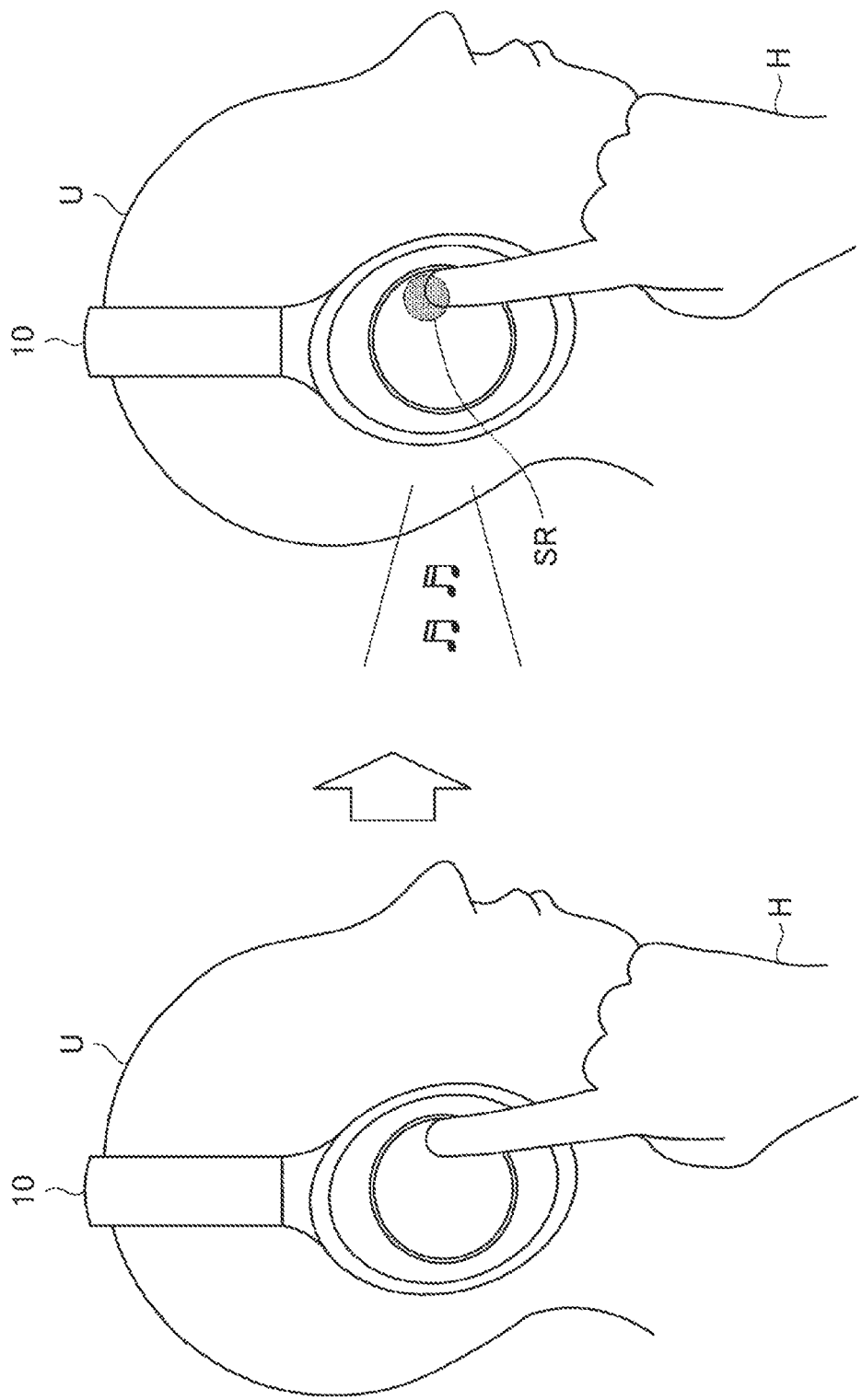
FIG. 17 is a diagram illustrating an example of output control of a notification sound related to a reference region whose position is arbitrarily determined, performed by the control unit 130 according to the embodiment.

Here, an example of output control of the notification sound related to a reference region whose position is arbitrarily determined, performed by the control unit 130 according to the present embodiment, will be described with reference to FIG. 17. FIG. 17 is a diagram illustrating an example of output control of the notification sound related to a reference region whose position is arbitrarily determined, performed by the control unit 130 according to the present embodiment. FIG. 17 illustrates the information processing terminal 10 being headphones worn on the user U.

In the left illustration of FIG. 17, the hand H of the user U as the operation body first touches the touch pad. At this point, there is no reference region SR. Here, the control unit 130 determines the position first touched by the hand H of the user U as the reference region SR.

In contrast, the right illustration of FIG. 17 includes the reference region SR determined by control unit 130. Here, with an indication that the hand H of the user U is positioned in the reference region SR according to the recognition status, the control unit 130 controls to output a notification sound corresponding to the reference region SR.

In this manner, with a configuration of determining the reference region SR by the control unit 130 when the user U starts an operation using the operation region, it is possible to implement comfortable operation corresponding to the habit of each of the users U.

2.2.6. Specific Example 6

Although the above-described specific examples are cases where the information processing terminal 10 is implemented as headphones and the operation region exists on the touch pad, the information processing terminal 10 may be implemented by earphones as described above. The earphones being the information processing terminal 10 may include a touch sensor or a proximity sensor as the input unit 110. Because of its smaller size compared to the headphones, the earphones may be difficult to operate with a touch pad and can be suitable for operation in space by a proximity sensor. Hereinafter, an example in which the earphones include a proximity sensor as the input unit 110 will be described. The position of the operation body in the space is recognized by the proximity sensor.

Figure 18:
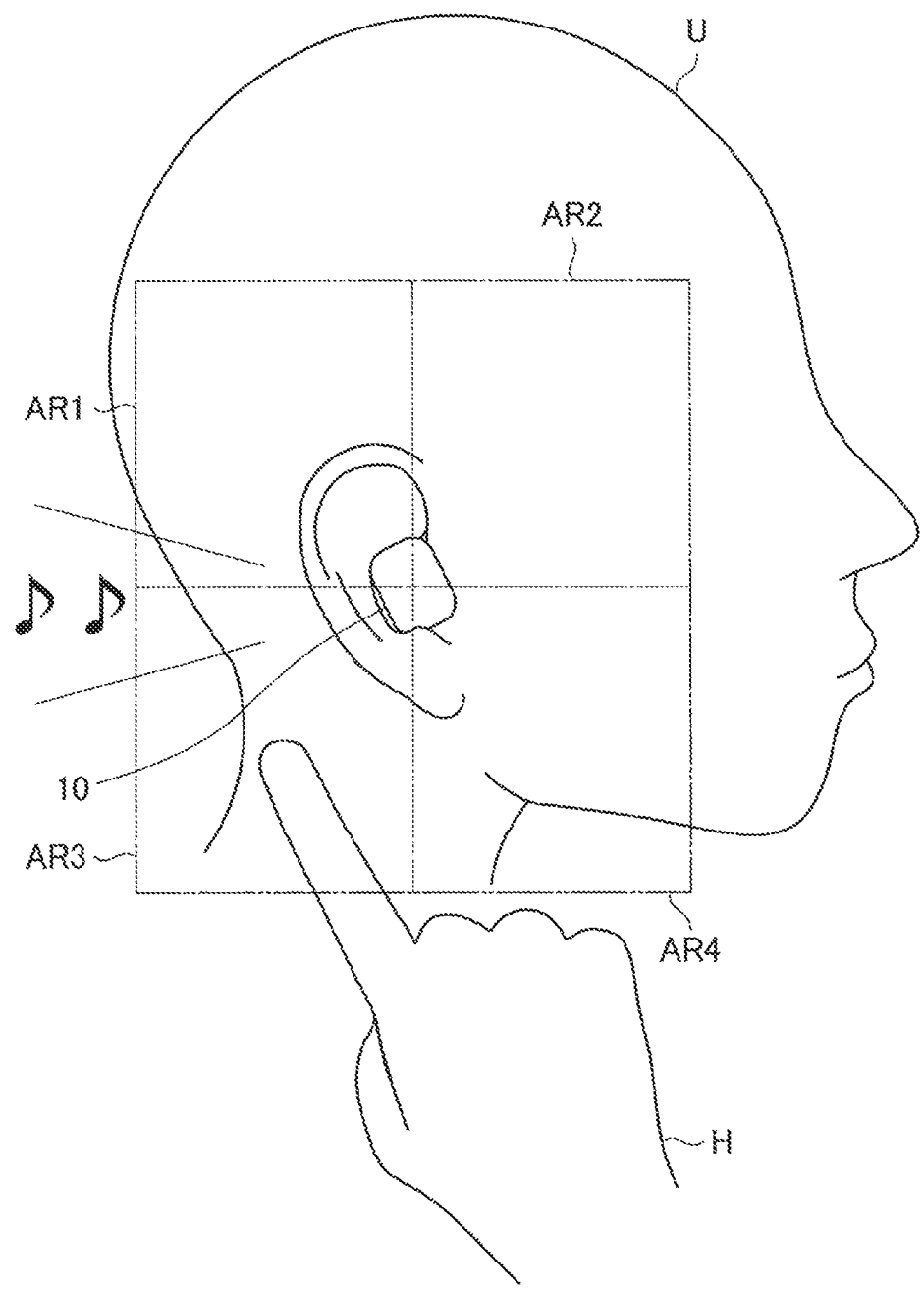
FIG. 18 is a diagram illustrating an example of a case where the operation region according to the embodiment exists in a space.

FIG. 18 is a diagram illustrating an example of a case where the operation region according to the present embodiment exists in a space. FIG. 18 illustrates an information processing terminal 10 being earphones, and operation regions AR1 to AR4 in space.

As illustrated in FIG. 18, the operation regions AR1 to AR4 exist in a three-dimensional space, not on a touch pad surface. The control unit 130 may control the output of the notification sound in a case where the operation body exists in any of the operation regions AR1 to AR4. Furthermore, the control unit 130 may dynamically control the output of the notification information related to the function corresponding to a gesture being executed in the operation regions AR1 to AR4 based on the recognition status of the operation body that is executing the gesture.

Furthermore, in a case where the operation region exists in the space, the distance between the operation body and the information processing terminal 10 can be detected by the proximity sensor. Therefore, in a case where the distance between the operation body and the information processing terminal 10 is indicated as the recognition status, the control unit 130 may control the output of the notification sound based on the distance.

FIG. 19 is a diagram illustrating an example of execution control of functions related to the information processing terminal 10 based on a distance between an operation body and the information processing terminal 10 in a case where the distance is indicated as a recognition status, performed by the control unit 130 according to the present embodiment. FIG. 19 illustrates the information processing terminal 10 being earphones, and the hand H of the user U.

As in the left illustration of FIG. 19, the hand H of the user U and the information processing terminal 10 are separated from each other by a distance D3. In a case where the recognition status indicates that the hand H of the user U has approached the information processing terminal 10 by a distance D4 as in the right illustration of FIG. 19, that is, in a case where the recognition status indicates that the gesture of bringing the hand H of the user U closer to the information processing terminal 10 is being executed, the control unit 130 controls the output of a notification sound based on the change in the distance from the distance D3 to the distance D4. In an example of FIG. 19, when the distance between the hand H of the user U and the information processing terminal 10 changes from the distance D3 to the distance D4, the control unit 130 increases the volume of the notification sound output by the information processing terminal 10.

Alternatively, the control unit 130 may control the output of the notification sound based on whether the operation body exists in the operation region. Specifically, the control unit 130 may control the output of the notification sound based on whether the operation body exists in a space detectable by the input unit 110.

Figure 20:
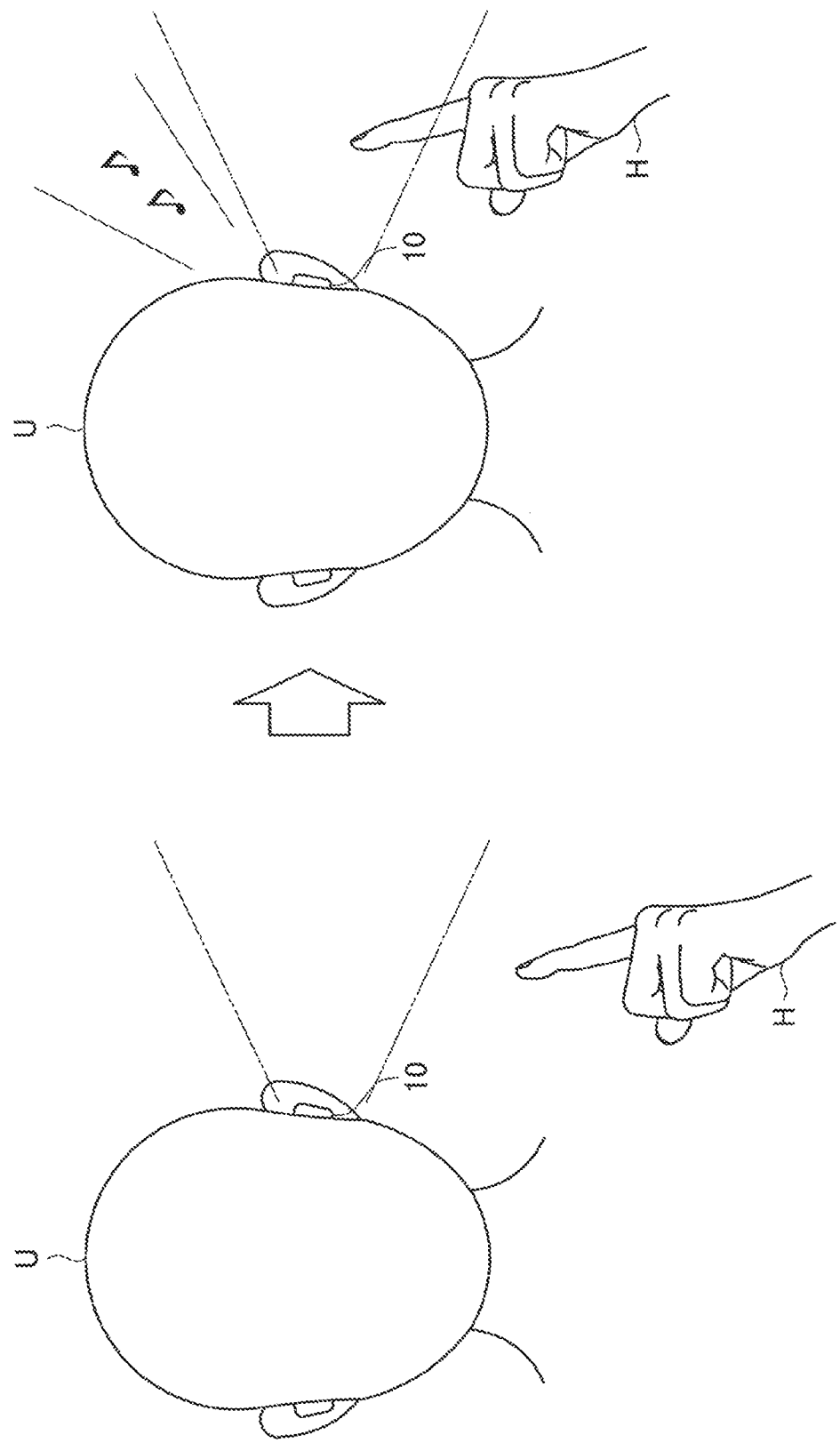
FIG. 20 is a diagram illustrating an example of a case where an operation region by the control unit 130 according to the embodiment exists in a space.

Here, an exemplary case where the operation region by the control unit 130 according to the present embodiment exists in a space will be described with reference to FIG. 20. FIG. 20 illustrates the information processing terminal 10 being earphones, and operation regions AR1 to AR4 in space.

In the left illustration of FIG. 20, the hand H of the user U being the operation body exists outside the space of the operation region. With an indication that the hand H of the user U exists outside the space of the operation region, the control unit 130 controls not to output a notification sound.

In contrast, in the right illustration of FIG. 20, the hand H of the user U is positioned in the space of the operation region. With an indication that the hand H of the user U is positioned in the space of the operation region according to the recognition status, the control unit 130 controls to output a notification sound corresponding to the reference region SR.

In this manner, it is possible to confirm whether the operation body is positioned in the space being the operation region, enabling the user U to grasp the operation region in the visually unrecognizable space.

The specific examples of the output control of the notification sound by the control unit 130 have been described above. Although the above are examples in which the information processing terminal 10 is implemented as headphones or earphones, the present disclosure is not limited to such an example. The information processing terminal 10 may be, for example, an in-vehicle touch panel. While driving an automobile, it is difficult to visually recognize a touch panel for performing various operations. At that time, the information processing terminal 10 provided on the back of the steering wheel can notify information by notification sound or vibration, enabling execution of various operations.

Furthermore, the information processing terminal 10 may be an autonomous mobile body or the like. During execution of a gesture operation toward the autonomous mobile body by the user U, the autonomous mobile body appropriately performs feedback with a notification sound or vibration, enabling the user U to enjoy interaction with the autonomous mobile body more. Furthermore, the above technology is also applicable to a device that provides virtual reality (VR) content. The user U often cannot visually recognize the controller or the like while using the VR content. Therefore, the user U can perform a more accurate operation while listening to the notification sound related to the operation of the controller.

3. Operation Examples

Figure 21:
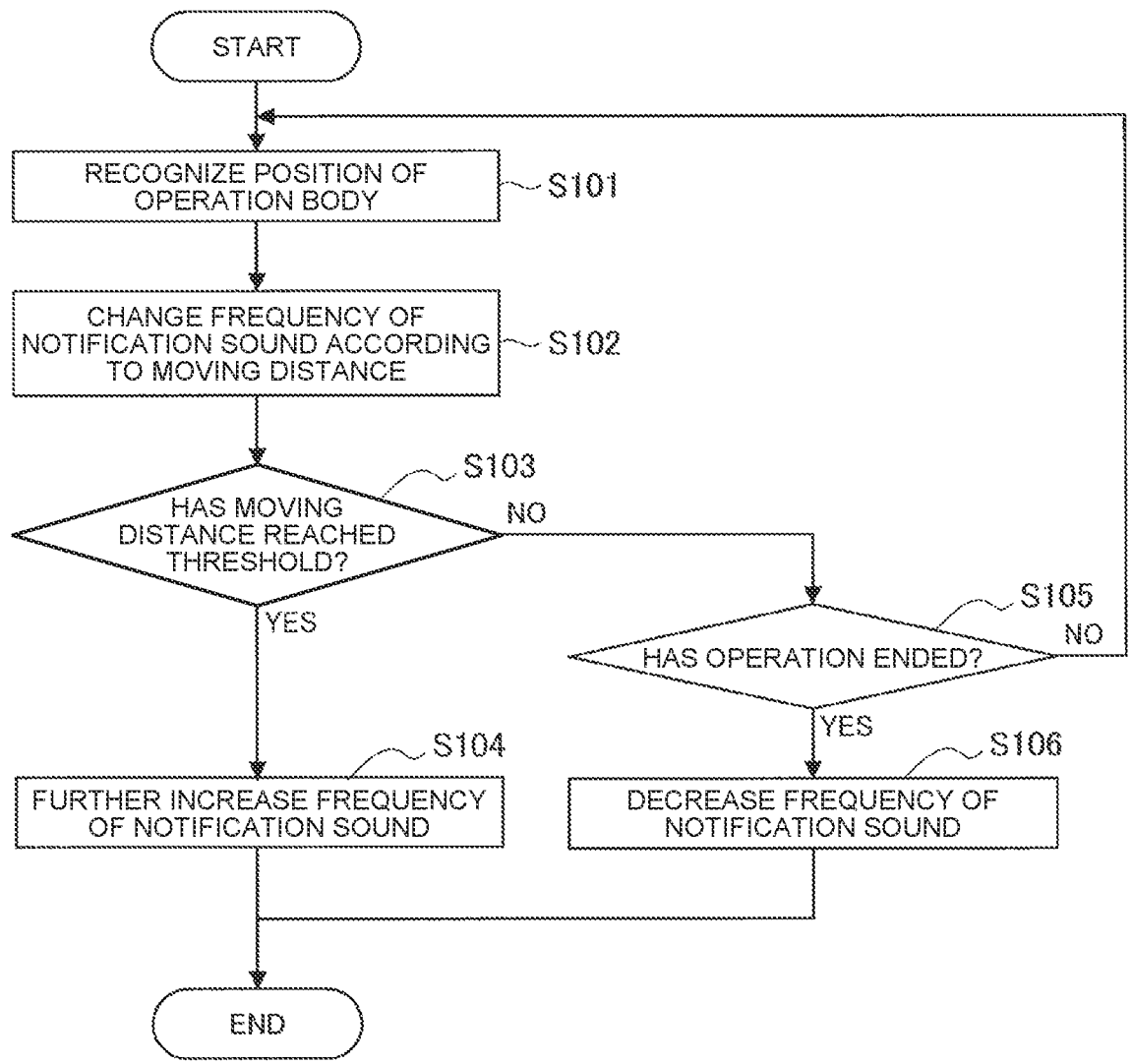
FIG. 21 is a diagram illustrating an example of a flow of operations related to output control of a notification sound based on a comparison between a moving distance of an operation body and a predetermined threshold, performed by the control unit 130 according to the embodiment.
Figure 22:
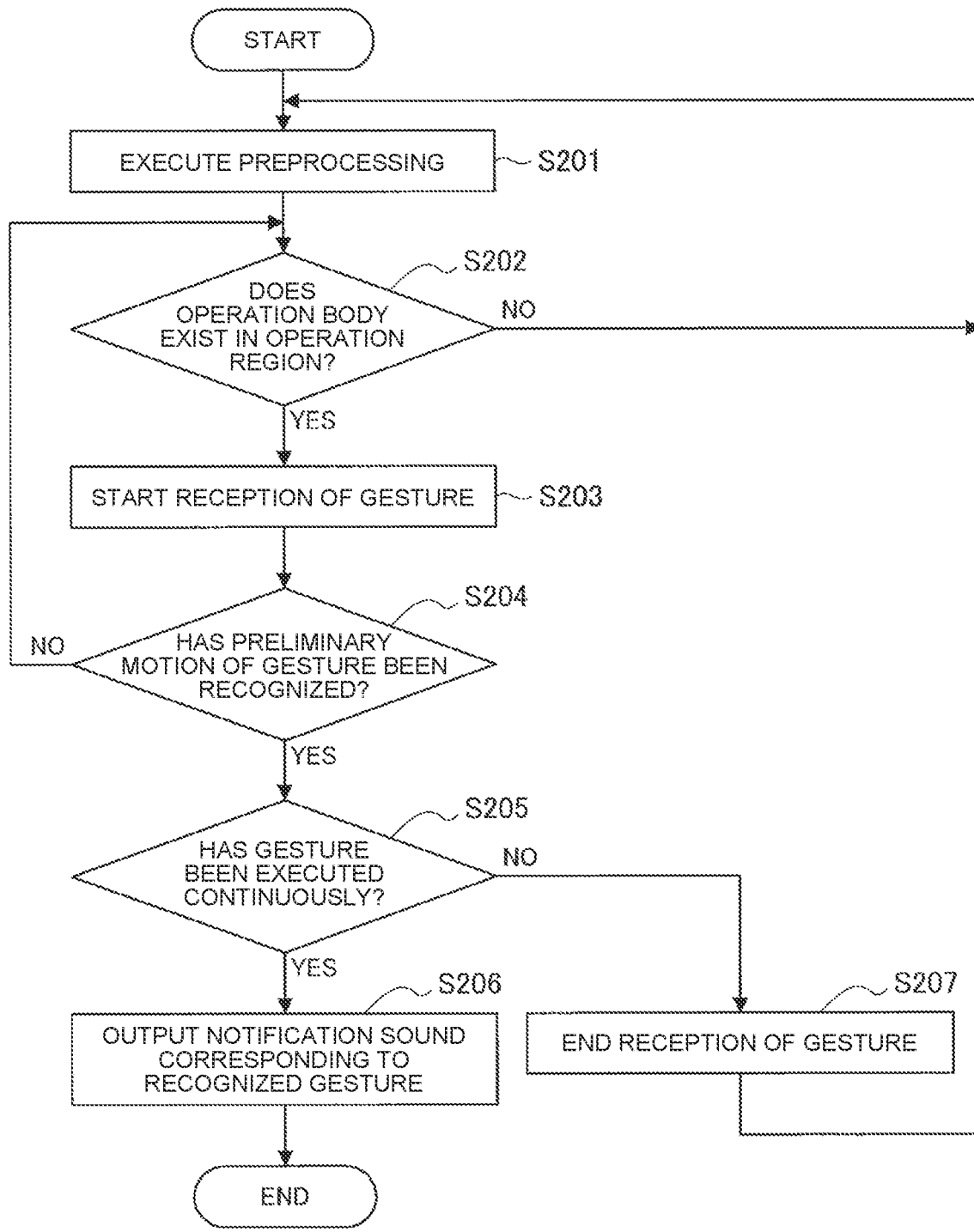
FIG. 22 is a diagram illustrating an example of a flow of operations related to output control of a notification sound based on a type of a gesture, performed by the control unit 130 according to the embodiment.

Next, with reference to FIGS. 21 to 23, a flow of operations related to the output control of the notification sound, performed by the control unit 130 according to the present embodiment, will be described.

First, with reference to FIG. 21, an example of a flow of operations related to the output control of a notification sound based on a comparison between a moving distance of an operation body and a predetermined threshold, performed by the control unit 130 according to the present embodiment, will be described. Referring to FIG. 21, first, the input unit 110 detects an operation body, and the recognition unit 120 recognizes the position of the detected operation body (S101). Next, the control unit 130 controls to change the pitch and frequency of the notification sound according to the moving distance of the operation body based on the position of the operation body recognized in step S101 (S102).

Next, when the moving distance of the operation body based on the position of the operation body recognized in step S101 exceeds a predetermined threshold (S103: YES), the control unit 130 increases the frequency of the notification sound (S104), and the information processing terminal 10 ends the operation. In contrast, when the moving distance of the operation body based on the position of the operation body recognized in step S101 does not exceed the predetermined threshold (S103: NO) and the operation by the operation body has not ended (S105: NO), the process returns to step S101.

As another pattern, when the moving distance of the operation body based on the position of the operation body recognized in step S101 does not exceed the predetermined threshold (S103: NO) and the operation by the operation body has ended (S105: YES), the control unit 130 decreases the frequency of the notification sound (S106), and the information processing terminal 10 ends the operation.

Next, an example of a flow of operations related to the output control of the notification sound based on the type of gesture, performed by the control unit 130 according to the present embodiment, will be described with reference to FIG. 22. Referring to FIG. 22, first, the control unit 130 executes preprocessing in a recognition process of the operation body (S201). Next, when the operation body is positioned within an operation range (S202: YES), the control unit 130 starts receiving a gesture (S203).

Next, when the recognition unit 120 has not recognized a preliminary motion of the gesture (S204: NO), the process returns to step S202. In contrast, when the recognition unit 120 has recognized the preliminary motion of the gesture (S204: YES), and has recognized that the gesture is continuously executed after the preliminary motion of the gesture (S205: YES), the control unit 130 controls the output of the notification sound recognized in step S205 (S206), and the information processing terminal 10 ends the operation.

As another pattern, when the recognition unit 120 has recognized the preliminary motion of the gesture (S204: YES), and has not recognized the continuous execution of the gesture after the preliminary motion of the gesture (S205: NO), the control unit 130 ends the reception of the gesture (S207), and the information processing terminal 10 ends the operation.

Next, an example of a flow of operations related to the output control of the notification sound corresponding to the operation region, performed by the control unit 130 according to the present embodiment, will be described with reference to FIG. 23. Referring to FIG. 23, first, when the operation body exists in an operation region (S301: YES), the control unit 130 controls to output a notification sound corresponding to the operation region (S302), and the control unit 130 ends the operation.

In contrast, when the operation body does not exist in the operation region (S301: NO) and a plurality of operation regions exists (S303: YES), the control unit 130 controls to change the pitch and frequency of the notification sound according to the distance of the operation body to each of the operation regions (S304), and the control unit 130 ends the operation. As another pattern, when the operation body does not exist in the operation region (S301: NO) and there is only one operation region (S303: NO), the control unit 130 controls to change the pitch and frequency of the notification sound according to the distance of the operation body to the one operation region (S305), and the control unit 130 ends the operation.

4. Hardware Configuration Example

Next, a hardware configuration example of an information processing terminal 10 according to an embodiment of the present disclosure will be described. FIG. 24 is a block diagram illustrating a hardware configuration example of the information processing terminal 10 according to an embodiment of the present disclosure. Referring to FIG. 24, the information processing terminal 10 includes, for example, a processor 871, ROM 872, RAM 873, a host bus 874, a bridge 875, an external bus 876, an interface 877, an input device 878, an output device 879, storage 880, a drive 881, a connection port 882, and a communication device 883. Note that the hardware configuration illustrated here is an example, and part of the components may be omitted. In addition, components other than the components illustrated here may be further included.

(Processor 871)

The processor 871 functions as an arithmetic processing device or a control device, for example, and controls the all or part of operations of individual components based on various programs recorded in the ROM 872, the RAM 873, the storage 880, or a removable recording medium 901.

(ROM 872 and RAM 873)

The ROM 872 is a means that stores a program loaded onto the processor 871, data used for calculation, and the like. The RAM 873 temporarily or permanently stores, for example, a program loaded onto the processor 871, various parameters that appropriately change when the program is executed, and the like.

(Host Bus 874, Bridge 875, External Bus 876, and Interface 877)

The processor 871, the ROM 872, and the RAM 873 are interconnected via the host bus 874 capable of high speed data transmission, for example. On the other hand, the host bus 874 is connected to the external bus 876 having a relatively low data transmission speed via the bridge 875, for example. In addition, the external bus 876 is connected to various components via the interface 877.

(Input Device 878)

Examples of the input device 878 include a mouse, a keyboard, a touch panel, a button, a switch, and a lever. Furthermore, the input device 878 can include a remote controller capable of transmitting a control signal using infrared rays or other radio waves. Furthermore, the input device 878 includes a sound input device such as a microphone.

(Output Device 879)

The output device 879 is a device capable of visually or audibly notifying the user of acquired information, and example of this include a display device such as a cathode ray tube (CRT), an LCD, or an organic EL, an audio output device such as a speaker or headphones, a printer, a mobile phone, a facsimile, or the like. Furthermore, the output device 879 according to the present disclosure includes various vibration devices capable of outputting tactile stimulation.

(Storage 880)

The storage 880 is a device for storing various types of data. Examples of devices used as the storage 880 include a magnetic storage device such as a hard disk drive (HDD), a semiconductor storage device, an optical storage device, and a magneto-optical storage device.

(Drive 881)

The drive 881 is, for example, a device that reads information recorded on the removable recording medium 901 such as a magnetic disk, an optical disk, a magneto-optical disk, or semiconductor memory, or writes information to the removable recording medium 901.

(Removable Recording Medium 901)

The removable recording medium 901 is, for example, a DVD medium, a Blu-ray (registered trademark) medium, an HD DVD medium, various types of semiconductor storage media, or the like. The removable recording medium 901 may naturally be, for example, an IC card on which a non-contact IC chip is mounted, an electronic device, or the like.

(Connection port 882)

The connection port 882 is, for example, a port for connecting an external connection device 902 such as a universal serial bus (USB) port, an IEEE 1394 port, a small computer system interface (SCSI), an RS-232C port, or an optical audio terminal.

(External Connection Device 902)

The external connection device 902 is, for example, a printer, a portable music player, a digital camera, a digital video camera, an IC recorder, or the like.

(Communication Device 883)

The communication device 883 is a communication device for connecting to a network, and is, for example, a communication card for wired or wireless LAN, Bluetooth (registered trademark), or wireless USB (WUSB), an optical communication router, an asymmetric digital subscriber line (ADSL) router, a modem for various communications, or the like.

5. Summary

As described above, the information processing terminal 10 according to the present embodiment is capable of confirming success or failure of an operation or performing a wider variety of operations in a region visually unrecognizable by the user.

Although the preferred embodiments of the present disclosure have been described in detail with reference to the accompanying drawings, the technical scope of the present disclosure is not limited to such examples. It is obvious that a person having ordinary knowledge in the technical field of the present disclosure can conceive various alterations or modifications within the scope of the technical idea described in the claims, and it is naturally understood that these also belong to the technical scope of the present disclosure.

Furthermore, the effects described in the present specification are merely illustrative or exemplary, and are not restrictive. That is, the technology according to the present disclosure can exhibit other effects obvious to those skilled in the art from the description of the present specification together with or instead of the above effects.

Note that the following configurations also belong to the technical scope of the present disclosure.

(1)
An information processing device comprising
a control unit that dynamically controls output of notification information related to a function corresponding to a gesture regarding function execution of the device based on a recognition status of an operation body that is executing the gesture in a predetermined operation region.

(2)
The information processing device according to (1),
wherein the notification information is a notification sound, and
the control unit dynamically controls output of the notification sound based on the recognition status.

(3)
The information processing device according to (2),
wherein the recognition status is a moving direction of the operation body, and
the control unit dynamically controls the output of the notification sound based on the moving direction indicated by the recognition status.

(4)
The information processing device according to (3),
wherein the control unit controls to change one or both of a frequency and a volume of the notification sound based on the moving direction of the operation body indicated by the recognition status.

(5)
The information processing device according to any one of (2) to (4),
wherein the recognition status is a type of the gesture being executed by the operation body, and
the control unit dynamically controls the output of the notification sound based on the type indicated by the recognition status.

(6)
The information processing device according to (5),
wherein the recognition status is a preliminary motion of the gesture, and
the control unit dynamically controls the output of the notification sound based on the preliminary motion indicated by the recognition status.

(7)
The information processing device according to (6),
wherein, in a case where the type of the gesture is specified, the control unit dynamically controls the output of the notification sound based on the specified type indicated by the recognition status.

(8)
The information processing device according to any one of (2) to (7),
wherein the recognition status is a moving speed of the operation body, and
the control unit dynamically controls the output of the notification sound based on the moving speed indicated by the recognition status.

(9)
The information processing device according to any one of (2) to (8),
wherein the operation body is a hand of a user.

(10)
The information processing device according to (9),
wherein the recognition status is represented by a status of how many fingers of the hand of the user are being used, and
the control unit dynamically controls the output of the notification sound based on the status of how many fingers are being used, indicated by the recognition status.

(11)
The information processing device according to (10),
wherein the control unit dynamically controls the output of the notification sound regarding the execution of the function corresponding to the status how many fingers are being used, indicated by the recognition status.

(12)
The information processing device according to any one of (2) to (11),
wherein the control unit dynamically controls output of the notification sound formed with a single sound source, based on the recognition status.

(13)
The information processing device according to (12),
wherein the control unit controls to change one or both of pitch and density of the notification sound formed with the single sound source, based on the recognition status.

(14)
The information processing device according to any one of (2) to (13),
wherein the recognition status is a moving distance of the operation body, and
the control unit dynamically controls the output of the notification sound based on a comparison between the moving distance indicated by the recognition status and a predetermined threshold.

(15)
The information processing device according to (14),
wherein the control unit dynamically controls the output of the notification sound based on a difference between the moving distance and the predetermined threshold.

(16)
An information processing method to be executed by a processor, the information processing method comprising
dynamically controlling output of notification information related to a function corresponding to a gesture regarding function execution of a device based on a recognition status of an operation body that is executing the gesture in a predetermined operation region.

(17)
A program for causing a computer to function as an information processing device, the information processing device comprising
a control unit that dynamically controls output of notification information related to a function corresponding to a gesture regarding function execution of the device based on a recognition status of an operation body that is executing the gesture in a predetermined operation region.

REFERENCE SIGNS LIST

10 INFORMATION PROCESSING TERMINAL
110 INPUT UNIT
120 RECOGNITION UNIT
130 CONTROL UNIT
140 OUTPUT UNIT
150 STORAGE UNIT
160 COMMUNICATION UNIT

The invention claimed is:

1. An information processing device comprising:
a control unit configured to dynamically control output of notification information related to a function corresponding to a gesture regarding function execution of the information processing device based on a recognition status of an operation body that is executing the gesture in a predetermined operation region,
wherein the control unit dynamically controls the output of the notification information corresponding to a reference region within the predetermined operation region where the gesture is started, and
wherein the control unit is implemented via at least one processor.

2. The information processing device according to claim 1,
wherein the notification information is a notification sound, and
the control unit dynamically controls the output of the notification sound based on the recognition status.

3. The information processing device according to claim 2,
wherein the recognition status is a moving direction of the operation body, and
the control unit dynamically controls the output of the notification sound based on the moving direction indicated by the recognition status.

4. The information processing device according to claim 3,
wherein the control unit controls to change one or both of a frequency and a volume of the notification sound based on the moving direction of the operation body indicated by the recognition status.

5. The information processing device according to claim 2,
wherein the recognition status is a type of the gesture being executed by the operation body, and
the control unit dynamically controls the output of the notification sound based on the type indicated by the recognition status.

6. The information processing device according to claim 5,
wherein the recognition status is a preliminary motion of the gesture, and
the control unit dynamically controls the output of the notification sound based on the preliminary motion indicated by the recognition status.

7. The information processing device according to claim 6,
wherein, in a case where the type of the gesture is specified, the control unit dynamically controls the output of the notification sound based on the specified type indicated by the recognition status.

8. The information processing device according to claim 2,
wherein the recognition status is a moving speed of the operation body, and
the control unit dynamically controls the output of the notification sound based on the moving speed indicated by the recognition status.

9. The information processing device according to claim 2,
wherein the operation body is a hand of a user.

10. The information processing device according to claim 9,
wherein the recognition status is represented by a status of how many fingers of the hand of the user are being used, and
the control unit dynamically controls the output of the notification sound based on the status of how many fingers are being used, indicated by the recognition status.

11. The information processing device according to claim 10,
wherein the control unit dynamically controls the output of the notification sound regarding the execution of the function corresponding to the status how many fingers are being used, indicated by the recognition status.

12. The information processing device according to claim 2,
wherein the control unit dynamically controls the output of the notification sound formed with a single sound source, based on the recognition status.

13. The information processing device according to claim 12,
wherein the control unit controls to change one or both of pitch and density of the notification sound formed with the single sound source, based on the recognition status.

14. The information processing device according to claim 2,
wherein the recognition status is a moving distance of the operation body, and
the control unit dynamically controls the output of the notification sound based on a comparison between the moving distance indicated by the recognition status and a predetermined threshold.

15. The information processing device according to claim 14,
wherein the control unit dynamically controls the output of the notification sound based on a difference between the moving distance and the predetermined threshold.

16. An information processing method to be executed by a processor, the information processing method comprising:
dynamically controlling output of notification information related to a function corresponding to a gesture regarding function execution of an information processing device based on a recognition status of an operation body that is executing the gesture in a predetermined operation region,
wherein the output of the notification information is dynamically controlled to correspond to a reference region within the predetermined operation region where the gesture is started.

17. A non-transitory computer-readable storage medium having embodied thereon a program, which when executed by a computer causes the computer to execute a method, the method comprising:
dynamically controlling output of notification information related to a function corresponding to a gesture regarding function execution of an information processing device based on a recognition status of an operation body that is executing the gesture in a predetermined operation region, wherein the output of the notification information is dynamically controlled to correspond to a reference region within the predetermined operation region where the gesture is started.

* * * * *